(12) United States Patent
Baek et al.

(10) Patent No.: US 12,452,886 B2
(45) Date of Patent: Oct. 21, 2025

(54) METHOD AND DEVICE FOR CONFIGURING BWP FOR CONTINUITY OF MBS SERVICE IN WIRELESS COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/923,518

(22) PCT Filed: May 10, 2021

(86) PCT No.: PCT/KR2021/005817
§ 371 (c)(1),
(2) Date: Nov. 4, 2022

(87) PCT Pub. No.: WO2021/230595
PCT Pub. Date: Nov. 18, 2021

(65) Prior Publication Data
US 2023/0189295 A1    Jun. 15, 2023

(30) Foreign Application Priority Data

May 11, 2020  (KR) .................. 10-2020-0056164
Oct. 22, 2020  (KR) .................. 10-2020-0137846

(51) Int. Cl.
*H04W 72/30*      (2023.01)
*H04L 5/00*       (2006.01)
(52) U.S. Cl.
CPC ........... *H04W 72/30* (2023.01); *H04L 5/0092* (2013.01)

(58) Field of Classification Search
CPC ... H04W 72/30; H04W 72/232; H04W 72/23; H04W 72/042; H04W 4/06;
(Continued)

(56) References Cited

U.S. PATENT DOCUMENTS 11,006,443 B2   5/2021  Tie et al.
11,284,221 B2   3/2022  Guo et al.
(Continued)

FOREIGN PATENT DOCUMENTS

CN         110087311 A    8/2019
KR   10-2018-0080989 A    7/2018
(Continued)

OTHER PUBLICATIONS

62959741—Spec-Drawings-Jan. 10, 2020 (Year: 2020).*
(Continued)

*Primary Examiner* — Rushil P. Sampat
(74) *Attorney, Agent, or Firm* — Jefferson IP Law, LLP

(57) ABSTRACT

Provided is an operating method of a terminal for receiving multicast and broadcast service (MBS) in a wireless communication system. The operating method may include receiving, from a base station, bandwidth part (BWP) configuration information for receiving MBS, the BWP configuration information including at least one of a BWP identity, temporary mobile group identities (TMGIs) of MBS services provided in a BWP, or group-radio network temporary identity (G-RNTI) information, or supplementary downlink (SDL) carrier configuration information for receiving MBS, and receiving first MBS data in a BWP corresponding to the BWP configuration information for receiving MBS or an SDL carrier corresponding to the SDL carrier configuration information for receiving MBS, in a radio resource control (RRC) idle mode or an RRC inactive (Continued)

mode, based on the received BWP configuration information or SDL carrier configuration information.

14 Claims, 20 Drawing Sheets

(58) Field of Classification Search
CPC ......... H04W 72/0446; H04W 72/0453; H04W 72/0457; H04W 72/20; H04W 72/044; H04L 5/0092; H04L 5/0044; H04L 1/08; H04L 1/1812; H04L 1/1896; H04L 5/0053; H04L 1/1685; H04L 1/1822
See application file for complete search history.

(56) References Cited

U.S. PATENT DOCUMENTS

| | | | |
|---|---|---|---|
| 11,425,681 | B2 | 8/2022 | Chen et al. |
| 2016/0337817 | A1 | 11/2016 | Malladi et al. |
| 2019/0036665 | A1* | 1/2019 | Park ................... H04L 5/0091 |
| 2019/0166580 | A1 | 5/2019 | Prasad et al. |
| 2019/0373667 | A1 | 12/2019 | Jeon et al. |
| 2020/0084698 | A1 | 3/2020 | Rune et al. |
| 2021/0250918 | A1* | 8/2021 | Liu ..................... H04W 72/20 |
| 2021/0258918 | A1* | 8/2021 | Hong ................ H04W 36/0007 |
| 2023/0021294 | A1* | 1/2023 | Wu ......................... H04W 4/50 |
| 2023/0040690 | A1* | 2/2023 | Chen .................... H04L 5/0053 |

FOREIGN PATENT DOCUMENTS

| | | |
|---|---|---|
| KR | 10-2018-0132135 A | 12/2018 |
| KR | 10-2021-0120391 A | 10/2021 |

OTHER PUBLICATIONS

62972516_Specification_Drawings_Feb. 10, 2020 (Year: 2020).*
International Search Report dated Aug. 18, 2021 issued in International Application No. PCT/KR2021/005817.
European Search Report dated Sep. 12, 2023; European Appln. No. 21804335.4-1215 / 4142399 PCT/KR2021005817.
Ericsson; Protocol structure and bearer modelling for NR MBS; 3GPP TSG-RAN WG2 #111e; R2-2007631; Electronic meeting; Aug. 17-28, 2020; Aug. 6, 2020.
Huawei; Email discussion [Post111-e][904][MBS] L2 Architecture; 3GPP TSG-RAN WG2 Meeting #112-e; R2-200xxxx; Electronic; Nov. 2-13, 2020; Oct. 13, 2020.
Korean Office Action with English translation dated Sep. 5, 2025; Korean Appln. No. 10-2020-0137846.

* cited by examiner

METHOD AND DEVICE FOR CONFIGURING BWP FOR CONTINUITY OF MBS SERVICE IN WIRELESS COMMUNICATION SYSTEM

TECHNICAL FIELD

The disclosure relates to a wireless communication system, and more particularly, to a method and apparatus for configuring a bandwidth part (BWP) for multicast and broadcast service (MBS) continuity in a wireless communication system.

BACKGROUND ART

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase coverage of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RANs), ultra-dense networks, device-to-device (D2D) communication, wireless backhaul, moving networks, cooperative communication, coordinated multi-points (CoMP), and received interference cancellation have been developed. In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks, machine-to-machine (M2M) communication, and machine-type communication (MTC) for connecting objects have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC communication are being implemented by using 5G communication technology including beamforming, MIMO, and array antennas. Application of a cloud RAN as the above-described big data processing technology may be an example of convergence of 5G communication technology and IoT technology.

Because a variety of services are providable due to the development of wireless communication systems as described above, a method for seamlessly providing services related to multicast and broadcast is particularly required.

DESCRIPTION OF EMBODIMENTS

Technical Problem

Provided are an apparatus and method capable of effectively supporting multicast and broadcast service (MBS) in a mobile communication system.

Solution to Problem

According to an embodiment of the disclosure, a terminal for receiving multicast and broadcast service (MBS) in a wireless communication system may be provided. The terminal may receive, from a base station, bandwidth part (BWP) configuration information for receiving MBS, the BWP configuration information including at least one of a BWP identity, temporary mobile group identities (TMGIs) of MBS services provided in a BWP, or a group-radio network temporary identity (G-RNTI), or supplementary downlink (SDL) carrier configuration information for receiving MBS, the SDL carrier configuration information including at least one of an SDL carrier identity, a physical-layer cell identity (PCI), or a SDL configuration indicator, and receive first MBS data in a BWP corresponding to the BWP configuration information for receiving MBS or an SDL carrier corresponding to the SDL carrier configuration information for receiving MBS, in a radio resource control (RRC) idle mode or an RRC inactive mode, based on the received BWP configuration information or SDL carrier configuration information.

BEST MODE

Figure 1:
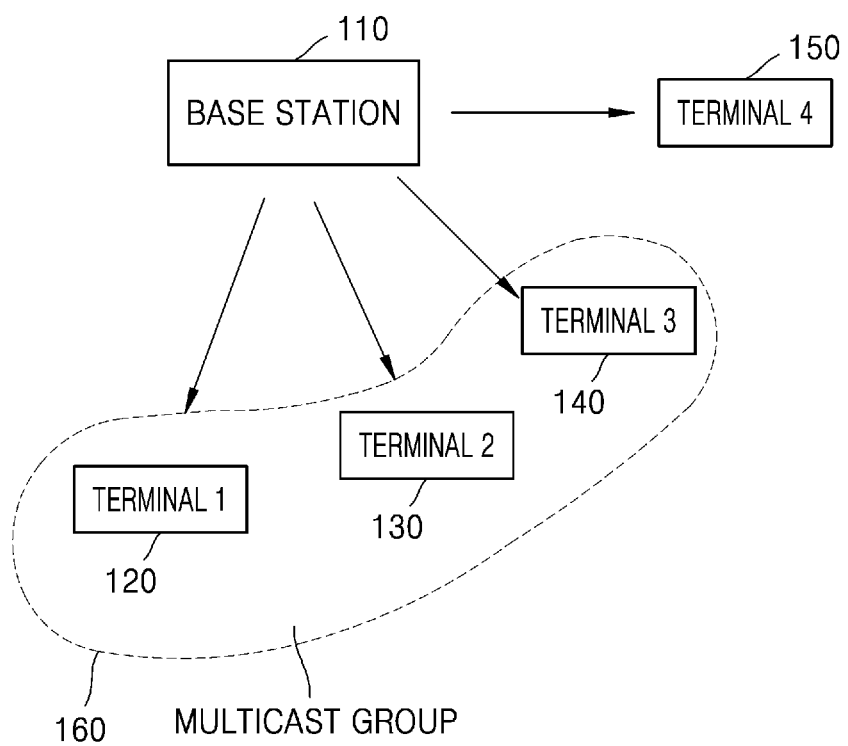
FIG. 1 is a diagram showing an operating method for multicast and broadcast service (MBS) communication, according to an embodiment of the disclosure.

According to an embodiment of the disclosure, an operating method of a base station for transmitting multicast and broadcast service (MBS) in a wireless communication system may include determining a bandwidth part (BWP) for MBS reception by a terminal, including configuration information of the determined BWP in at least one of a system information block (SIB), a radio resource control (RRC) release message, or an RRC reconfiguration message and transmitting the configuration information to the terminal, and transmitting MBS services to the terminal by using the determined BWP.

According to another embodiment of the disclosure, an operating method of a terminal for receiving multicast and broadcast service (MBS) in a wireless communication system may include receiving, from a base station, configuration information of a BWP for MBS reception by the terminal of a radio resource control (RRC) idle mode or an RRC inactive mode, and receiving MBS services from the base station, based on the configuration information of the BWP, wherein the configuration information of the BWP for MBS reception may be included and received in at least one of a system information block (SIB), an RRC release message, or an RRC reconfiguration message.

According to another embodiment of the disclosure, a terminal for receiving multicast and broadcast service (MBS) in a wireless communication system may be provided. The terminal may include a transceiver, and at least one processor configured to receive, from a base station, bandwidth part (BWP) configuration information for receiving MBS, the BWP configuration information including at least one of a BWP identity, temporary mobile group identities (TMGIs) of MBS services provided in a BWP, or a group-radio network temporary identity (G-RNTI), or supplementary downlink (SDL) carrier configuration information for receiving MBS, the SDL carrier configuration information including at least one of an SDL carrier identity, a physical-layer cell identity (PCI), or a SDL configuration indicator, and receive first MBS data in a BWP corresponding to the BWP configuration information for receiving MBS or an SDL carrier corresponding to the SDL carrier configuration information for receiving MBS, in a radio resource control (RRC) idle mode or an RRC inactive mode, based on the received BWP configuration information or SDL carrier configuration information. In an embodiment, the BWP configuration information for receiving MBS may include at least one of initial BWP configuration information or downlink (DL) BWP configuration information.

In an embodiment, at least one of the BWP configuration information for receiving MBS or the SDL carrier configuration information for receiving MBS may be included and transmitted in a system information block (SIB) or an RRC release message.

In an embodiment, the BWP configuration information for receiving MBS may further include at least one of search space information or control resource set (CORESET) information for a physical downlink control channel (PDCCH) to be monitored to receive the first MBS data.

In an embodiment, the BWP configuration information for receiving MBS may include the DL BWP configuration information including the G-RNTI, and the at least one processor may be further configured to determine a DL radio resource for receiving MBS in a DL BWP corresponding to the received DL BWP configuration information, by using the G-RNTI, and receive the first MBS data in the determined DL radio resource.

In an embodiment, the BWP configuration information for receiving MBS may include the DL BWP configuration information including the G-RNTI, and the at least one processor may be further configured to determine a DL radio resource in the initial BWP, by using the G-RNTI, and receive the first MBS data in a DL BWP corresponding to the DL BWP configuration information.

In an embodiment, the at least one processor may be further configured to transmit, to the base station, at least one of an RRC connection request message or an RRC resume request message including MBS information for the first MBS data, receive, from the base station, configuration information for second MBS data receivable in an RRC connected mode, and receive the second MBS data in the RRC connected mode, based on the configuration information for the second MBS data, and the MBS information for the first MBS data may include at least one of TMGIs of MBS services being received by the terminal in the RRC idle mode or the RRC inactive mode, an indicator indicating that the MBS services are desired to be continuously received in the RRC connected mode, a list of MBS services desired to be continuously received in the RRC connected mode, or a list of MBS services no longer desired to be received.

In an embodiment, the SDL carrier configuration information for receiving MBS may include an identity of the SDL carrier, or a list of MBS services being provided in the SDL carrier.

In an embodiment, the base station may operate a first BWP providing MBS services that the terminal desires to receive, and a second BWP not providing the MBS services that the terminal desires to receive, the at least one processor may be further configured to receive, from the base station, information about MBS services provided in each of the first and second BWPs, or information about the first BWP, and the information about the MBS services provided in each of the first and second BWPs, or the information about the first BWP may be included and transmitted in at least one of an RRC reconfiguration message, an RRC setup message, an RRC reestablishment message, an RRC release message, or a SIB.

According to another embodiment of the disclosure, a base station for providing multicast and broadcast service (MBS) in a wireless communication system may be provided. The base station may include a transceiver, and at least one processor configured to transmit, to a terminal of a radio resource control (RRC) idle mode or an RRC inactive mode, bandwidth part (BWP) configuration information for providing MBS, the BWP configuration information including at least one of a BWP identity, temporary mobile group identities (TMGIs) of MBS services provided in a BWP, or a group-radio network temporary identity (G-RNTI), or supplementary downlink (SDL) carrier configuration information for providing MBS, the SDL carrier configuration information including at least one of an SDL carrier identity, a physical-layer cell identity (PCI), or a SDL configuration indicator, and transmit, to the terminal, first MBS data in a BWP corresponding to the BWP configuration information for providing MBS or an SDL carrier corresponding to the SDL carrier configuration information for providing MBS, based on the transmitted BWP configuration information. In an embodiment, the BWP configuration information for providing MBS may include at least one of initial BWP configuration information or downlink (DL) BWP configuration information.

In an embodiment, the at least one processor may be further configured to receive, from the terminal, at least one of an RRC connection request message or an RRC resume request message including MBS information for the first MBS data, transmit, to the terminal, configuration information for second MBS data receivable in an RRC connected mode, and transmit the second MBS data in the RRC connected mode to the terminal of the RRC connected mode, based on the configuration information for the second MBS data, and the MBS information for the first MBS data may include at least one of TMGIs of MBS services being received by the terminal in the RRC idle mode or the RRC inactive mode, an indicator indicating that the MBS services are desired to be continuously received in the RRC connected mode, a list of MBS services desired to be continuously received in the RRC connected mode, or a list of MBS services no longer desired to be received.

In an embodiment, the base station may operate a first BWP providing MBS services that the terminal desires to receive, and a second BWP not providing the MBS services that the terminal desires to receive, the at least one processor may be further configured to transmit, to the terminal, information about MBS services provided in each of the first and second BWPs, or information about the first BWP, and the information about the MBS services provided in each of the first and second BWPs, or the information about the first BWP may be included and transmitted in at least one of an RRC reconfiguration message, an RRC setup message, an RRC reestablishment message, an RRC release message, or a SIB.

MODE OF DISCLOSURE

Hereinafter, the disclosure will be described in detail by explaining embodiments of the disclosure with reference to the attached drawings. In the following description of the disclosure, a detailed description of known functions or configurations incorporated herein will be omitted when it may make the subject matter of the disclosure unclear. The terms used below are defined considering functions in the disclosure, and may be changed according to the customs or the intents of users or operators. Accordingly, definitions of the terms are understood on the basis of the entire description of this specification.

For the same reasons, some elements are exaggerated, omitted, or schematically illustrated in drawings. Also, the size of each element does not completely reflect a real size thereof. In the drawings, like or corresponding elements are denoted by like reference numerals.

Advantages and features of the disclosure and methods of accomplishing the same may be understood more readily by reference to the following detailed description of embodiments and the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art, and the disclosure will only be defined by the appended claims. Throughout the disclosure, like reference numerals denote like elements.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may produce manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be configured to be in an addressable storage medium, or be configured to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or a secure multimedia card. Also, the "unit" may include one or more processors.

In the following description of the disclosure, a detailed description of known functions or configurations incorporated herein will be omitted when it may make the subject matter of the disclosure unclear. Hereinafter, the disclosure will be described in detail by explaining embodiments of the disclosure with reference to the attached drawings.

In the following description, terms identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used.

As used herein, a base station is an entity for allocating resources to terminals and may include at least one of a gNode B (gNB), an eNode B (eNB), a Node B (NB), a base station (BS), a radio access unit, a base station controller, or a node on a network. A terminal may include a user equipment (UE), a mobile station (MS), a cellular phone, a smartphone, a computer, or a multimedia system capable of performing communication functions. The term "terminal" may indicate any of mobile phones, narrowband Internet of things (NB-IoT) devices, sensors, and other wireless communication devices. However, the base station and the terminal are not limited to the above examples.

To facilitate explanation, the disclosure uses terms and names defined in the $3^{rd}$ Generation Partnership Project (3GPP) long term evolution (LTE) and/or 3GPP new radio (NR) communication standards. However, the disclosure is not limited to these terms and names and may be equally applied to systems conforming to other standards. As used herein, the term "eNB" may be used interchangeably with the term "gNB" for convenience of explanation. That is, a base station explained as an eNB may also indicate a gNB.

In particular, the disclosure is applicable to 3GPP NR (or $5^{th}$ generation (5G)) mobile communication standards. The disclosure is applicable to intelligent services (e.g., smart home, smart building, smart city, smart car or connected car, healthcare, digital education, retail, security, and safety services) based on 5G communication technologies and Internet of things (IoT)-related technologies. As used herein, the term "eNB" may be used interchangeably with the term "gNB" for convenience of explanation. That is, a base station explained as an eNB may also indicate a gNB. The term "terminal" may indicate any of mobile phones, NB-IoT devices, sensors, and other wireless communication devices.

Wireless communication systems providing voice-based services are being developed to broadband wireless communication systems providing high-speed and high-quality packet data services according to communication standards such as high speed packet access (HSPA), long term evolution (LTE) (or evolved universal terrestrial radio access (E-UTRA)), LTE-advanced (LTE-A), and LTE-pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL), and single carrier-frequency division multiple access (SC-FDMA) for an uplink (UL). The UL refers to a radio link for transmitting data or a control signal from a terminal (e.g., a UE or a MS) to a base station (e.g., an eNB or a BS), and the DL refers to a radio link for transmitting data or a control signal from the base station to the terminal. The above-described multiple connectivity schemes distinguish between data or control information of different users by assigning time-frequency resources for the data or control information of the users not to overlap each other, i.e., to achieve orthogonality therebetween.

As post-LTE systems, 5G systems need to support services capable of simultaneously reflecting and satisfying various requirements of users, service providers, etc. Services considered for the 5G systems include enhanced mobile broadband (eMBB), massive machine-type communication (mMTC), and ultra-reliability low-latency communication (URLLC).

According to an embodiment, the eMBB may be aimed to provide an enhanced data rate compared to a data rate supported by LTE, LTE-A, or LTE-Pro. For example, the eMBB for the 5G systems needs to provide a peak data rate of 20 gigabits per second (Gbps) for a DL and a peak data rate of 10 Gbps for a UL in terms of one base station. In addition to the peak data rate, the 5G systems also need to provide an increased user perceived data rate. To satisfy these requirements, the 5G systems require various enhanced transmission/reception technologies including enhanced multiple-input and multiple-output (MIMO). Compared to LTE systems using a transmission bandwidth of up to 20 megahertz (MHz) in a 2 gigahertz (GHz) band, the data rate required for the 5G systems may be satisfied by using a frequency bandwidth wider than 20 MHz in a frequency band of 3 GHz to 6 GHz or in a frequency band higher than or equal to 6 GHz.

At the same time, the mMTC is considered for the 5G systems to support application services such as IoT. The mMTC may be required to, for example, support massive user access within a cell, enhance terminal coverage, increase battery time, and reduce user charges in order to efficiently provide the IoT. The IoT provides a communication function by using a variety of sensors attached to various devices, and thus needs to support a large number of terminals within a cell (e.g., 1,000,000 terminals/km$^2$). In addition, because terminals supporting mMTC are likely to be located in a dead zone not covered by a cell, e.g., a basement of a building, due to service characteristics, the mMTC may require a wider coverage compared to the other services provided by the 5G systems. The terminals supporting mMTC need to be low-priced, and may require a very long battery life time, e.g., 10 years to 15 years, because batteries are not frequently replaceable.

Lastly, the URLLC is a cellular-based wireless communication service used in a mission-critical manner, and may be used for remote control of robots or machinery, industrial automation, unmanned aerial vehicles, remote healthcare, emergency alert, etc. Thus, communication provided by URLLC needs to provide very low latency (ultra-low latency) and very high reliability (ultra-reliability). For example, a service supporting URLLC needs to satisfy an air interface latency less than 0.5 milliseconds and, at the same time, requires a packet error rate less than or equal to $10^{-5}$. Therefore, for the service supporting URLLC, the 5G systems need to provide a smaller transmit time interval (TTI) compared to other services and, at the same time, may be required to allocate a wide resource in a frequency band to ensure reliability of a communication link.

The above-described three services considered for the 5G systems, i.e., eMBB, URLLC, and mMTC, may be multiplexed and provided by one system. In this case, the services may use different transmission and reception schemes and different transmission and reception parameters to satisfy different requirements for the services. However, the above-described mMTC, URLLC, and eMBB are merely examples of different types of services, and services to which the disclosure is applicable are not limited thereto.

Although LTE, LTE-A, LTE Pro, or 5G (or NR) systems are mentioned as examples in the following description, embodiments of the disclosure are also applicable to other communication systems having similar technical backgrounds or channel types. The embodiments of the disclosure may be applied to other communication systems through partial modification without significantly departing from the scope of the disclosure by the judgment of one of ordinary skill in the art.

Hereinafter, the disclosure will be described in detail by explaining embodiments of the disclosure with reference to the attached drawings.

FIG. 1 is a diagram showing an operating method for multicast and broadcast service (MBS) communication, according to an embodiment of the disclosure. The MBS communication refers to a communication method between one transmitter and a plurality of receivers in a wireless communication system. Herein, the transmitter may be a base station, and each receiver may be a terminal. However, without being limited thereto, the transmitter may be a terminal Referring to FIG. 1, a procedure of performing MBS communication between a base station 110 serving as the transmitter and terminals 120, 130, 140, and 150 serving as the receivers is shown. The MBS communication may be broadcast communication for a plurality of unspecified receivers, or multicast communication for a plurality of specific receivers. When communication is performed in a multicast manner, the base station may configure only specific terminals to receive multicast packets. To this end, a set of terminals for specific multicast communication may be configured, and such terminals are referred to as a multicast group 160 in FIG. 1.

The terminals 120, 130, and 140 in the multicast group 160 may be allocated the same group-radio network temporary identity (G-RNTI) from the base station 110 to receive data allocated with the G-RNTI. The embodiment of FIG. 1 assumes that the terminal 1 120, the terminal 2 130, and the terminal 3 140 are configured as one multicast group 160 and allocated the G-RNTI to receive data from the base station 110 in a multicast manner. The terminal 4 150, which is not included in the multicast group so as not to be allocated the G-RNTI, may not receive the data received by the terminal 1 120, the terminal 2 130, and the terminal 3 140 from the base station 110.

One or more multicast groups may be configured in the coverage of the base station 110, and each multicast group may be identified by a G-RNTI. One terminal may be allocated one or more G-RNTIs from the base station 110.

Using a G-RNTI value allocated in a radio resource control (RRC) connected mode, the terminal may receive multicast data in an RRC idle mode or an RRC inactive mode as well as the RRC connected mode. The G-RNTI may be included in at least one of an RRC reconfiguration message, an RRC setup message, or an RRC reestablishment message receivable by the terminal in the RRC connected mode, so as to be configured for the terminal. However, without being limited thereto, the base station may transmit, to the terminal, a system information block (SIB) including a G-RNTI value receivable by the terminal. The terminal, which is allocated the G-RNTI value according to one or more of the above-described various methods, may apply the G-RNTI value after the G-RNTI value is allocated.

Figure 2:
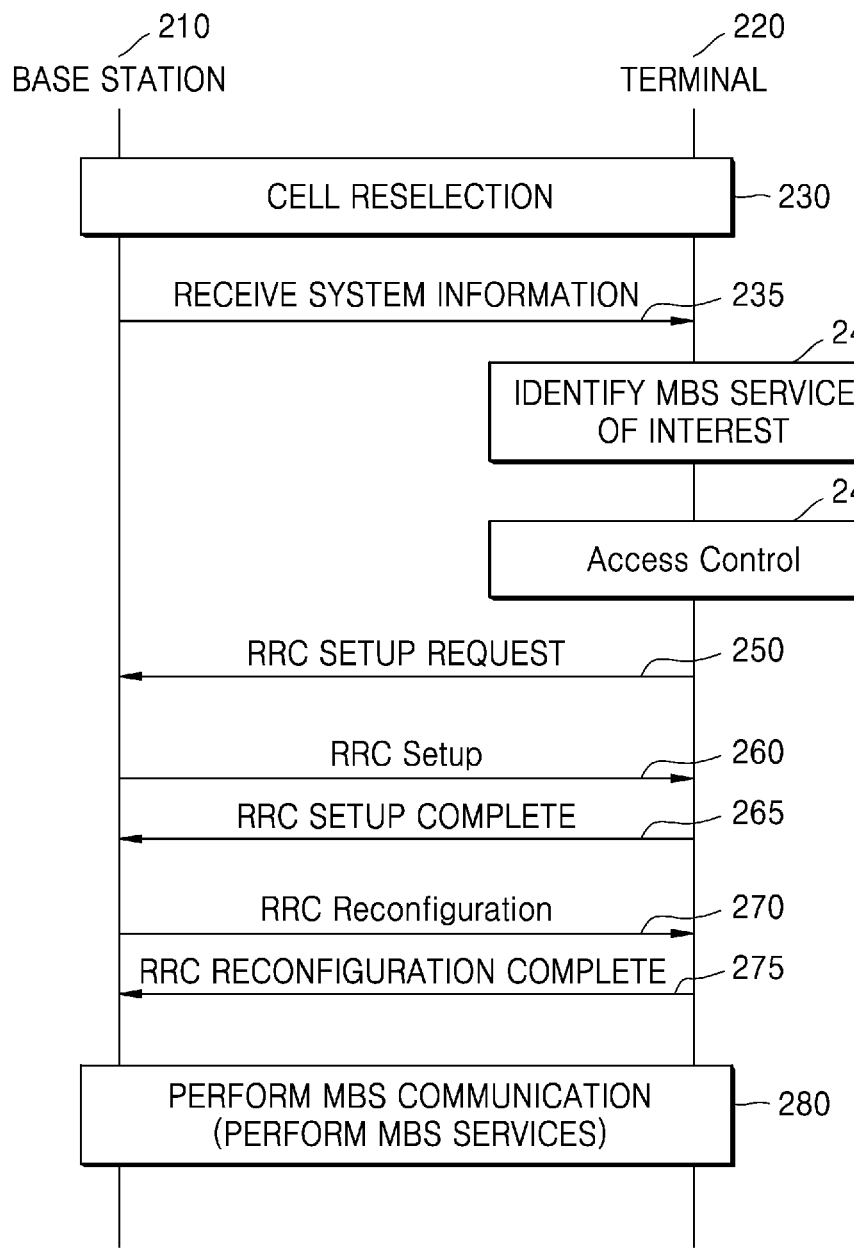
FIG. 2 is a diagram showing a configuration procedure for performing MBS communication, according to an embodiment of the disclosure.

FIG. 2 is a diagram showing a configuration procedure for performing MBS communication, according to an embodiment of the disclosure.

Referring to FIG. 2, a terminal 220, which is not RRC-connected to a base station 210, may select a base station to request MBS services to perform MBS communication. In this case, in operation 230, the terminal 220 may perform a cell selection procedure or a cell reselection procedure to receive synchronization signals transmitted from base stations and select a base station corresponding to the highest received power. The embodiment of FIG. 2 assumes that the terminal having transitioned from an initial RRC connected mode to an RRC idle mode or an RRC inactive mode performs a cell reselection operation to select a cell.

In operation 235, the terminal 220 may receive a SIB from the selected cell. In this case, when the terminal 220 desires to receive MBS services, the terminal 220 may receive, among SIBS, a SIB including MBS information. The SIB including the MBS information may include a list of MBS services being already provided or providable by each serving cell. The list of MBS services being already provided or providable by each serving cell may be referred to as an AvailableMBSList. The AvailableMBSList may include MBS session information. The MBS session information may include temporary mobile group identity (TMGI) values for identifying groups, and MBS sessionID values. Each TMGI value may include a public land mobile network (PLMN) ID (plmn-id) for identifying a communication service provider, and a serviceID for identifying a service provided by the communication service provider. When the above-mentioned types of information are combined, the AvailableMBSList may have a structure shown in the following example.

AvailableMBSList=MBSSessionInfoList
   MBSSessionInfoList=Sequence of (tmgi, sessionID)
      tmgi=(plmn-id, serviceID)

When all terminals request RRC setup to receive all MBS services, the base station may be overloaded due to instantaneous access by many terminals. Therefore, access control for MBS services may be required. To this end, an access category value and a uac-BarringForAccessIdentity for access control may be configured for each TMGI. Using the access category and uac-BarringForAccessIdentity configured as described above, the number of access requests to the base station may be controlled for each TMGI. Although the embodiment of FIG. 2 assumes that the terminal receives the SIB including the MBS information, without being limited thereto, the MBS information may be transmitted using a downlink (DL) information transfer message.

In operation 240, the terminal 220 having received the SIB including the MBS information may identify MBS services of interest in the list of MBS services being already provided or providable by each serving cell. The terminal

220 may determine which MBS services the terminal 220 is interested in, based on MBS services required by applications of the terminal 220, or another condition. The terminal 220 may identify the MBS services based on the TMGIs. That is, the terminal 220 may check whether the TMGIs of the MBS services that the terminal 220 desires to receive (or the terminal 220 is interested in) are included in the SIB including the MBS information. Specifically, the terminal 220 may check whether the TMGIs of the MBS services that the terminal 220 desires to receive are included in the AvailableMBSList of the SIB including the MBS information. When the TMGIs of the MBS services that the terminal 220 desires to receive are included in the SIB including the MBS information, the terminal 220 may perform RRC connection setup to receive the MBS services. In operation 245, to determine whether to start RRC connection setup, the terminal 220 may perform access control. Based on PLMN IDs included in the TMGIs of the MBS services to be received, the terminal 220 may perform access control by using unified access control (UAC)-barring information for the PLMN IDs. It may be determined whether access to a uac-BarringForAccessIdentity and an access category of the MBS services that the terminal 220 desires to receive is allowed. When access to the MBS services is allowed, the terminal 220 may start an RRC connection request procedure.

In operation 250, when access by the terminal 220 to receive the MBS services is allowed, the terminal 220 may transmit an RRC setup request message to the base station 210. However, without being limited thereto, an RRC reestablishment request message may also be used for the same purpose as the RRC setup request message. The RRC setup request message or the RRC reestablishment request message is a general message usable for the terminal to transition to an RRC connected mode, and thus may include a cause value indicating for what purpose the terminal desires to transition to the RRC connected mode. In this case, when the terminal 220 desires to receive MBS services, the terminal 220 may transmit, to the base station 210, the RRC setup request message or RRC reestablishment request message including a cause value indicating that MBS configuration is desired. However, when the RRC setup request message or the RRC reestablishment request message is not to receive MBS services, the terminal 220 may transmit the RRC setup request message or the RRC reestablishment request message by using a cause value transmitted from a higher layer.

In operation 260, the base station 210 may transmit an RRC setup message to the terminal 220 to transition the terminal 220 to the RRC connected mode. However, without being limited thereto, an RRC reestablishment message may also be used for the same purpose as the RRC setup message. When the terminal 220 receives the RRC setup message or the RRC reestablishment message, a signaling radio bearer 1 (SRB1) may be configured by SRB1 configuration information included in the received message. The SRB1 may be a radio bearer for exchanging RRC messages between the base station 210 and the terminal 220.

In operation 265, the terminal 220 may apply the configuration information included in the RRC setup message or the RRC reestablishment message, and transmit an RRC setup complete message or an RRC reestablishment complete message to the base station 210 to signal that the configuration received from the base station 210 is successfully applied. In addition, the RRC setup complete message or RRC reestablishment complete message transmitted in operation 265 may include a list of MBS services that the terminal 220 desires to receive. The list of MBS services may be a list including TMGI values corresponding to the MBS services that the terminal 220 desires to receive. In this case, the TMGIs including the list of MBS services may include all or some of TMGIs included in the list of MBS services being already provided or providable by each serving cell, which is included in the SIB or DL information transfer message transmitted from the base station 210 in operation 235.

Because the SRB1 is configured and the list of MBS services that the terminal 220 desires to receive is provided to the base station 210 in operation 265, in operation 270, the base station 210 may configure reception of MBS services based on the received information. The MBS services may be configured using an RRC reconfiguration message transmitted from the base station 210 to the terminal 220. The RRC reconfiguration message may include, for example, configuration information of a signaling radio bearer 2 (SRB2) used to transmit or receive non-access stratum (NAS) messages, a data radio bearer (DRB) used to transmit or receive data, and a point to multipoint (PTM) DRB to be used for multicast transmission. Herein, the PTM DRB may be configured without being distinguished from a normal DRB, or configured by a received G-RNTI. In addition, a radio link control (RLC) bearer to transmit the configured radio bearer may be configured, and a radio bearer to be connected to the RLC bearer may also be configured. Herein, a G-RNTI used when terminals belonging to a multicast group receive multicast data may also be configured. The G-RNTI is an RNTI configured to receive transport blocks (TBs), and may be used to indicate scheduling information for a physical downlink shared channel (PDSCH). The G-RNTI may be configured per media access control (MAC) entity, or configured per bandwidth part (BWP). When the G-RNTI is configured per BWP, the configured G-RNTI may be used only to receive PDSCH resources of the BWP. That is, the G-RNTI may not be used in other BWPs. To this end, the G-RNTI may be included and configured in a BWP-Downlink configuration field of an RRC message. A BWP ID to be used to configure the G-RNTI may also be configured. In another embodiment, the G-RNTI may be configured per cell. When the G-RNTI is configured per cell, the configured G-RNTI may be used only to receive PDSCH resources of the cell. That is, the G-RNTI may not be used in other cells. To this end, the G-RNTI may be included and configured in a cell configuration field of an RRC message. A cell ID to be used to configure the G-RNTI may also be configured.

A BWP and a search space may be separately configured for MBS reception. Configuration information of a BWP and search space for receiving specific MBS services may be transmitted from the base station to the terminal, and an MBS BWP and an MBS search space may be included in the configuration information of the BWP and search space for receiving the specific MBS services. Herein, the MBS BWP may refer to a BWP to which the allocated G-RNTI is applied. According to an embodiment, a BWP corresponding to a BWP-Downlink configuration field including the G-RNTI may be the MBS BWP. The MBS search space may be a search space corresponding to search space configuration information including a downlink control information (DCI) format for MBS reception, or a search space corresponding to search space configuration information including an indicator of a search space for MBS reception. For example, the search space configuration information may include a 1-bit indicator indicating whether the configured search space is an MBS search space. When the indicator indicates an MBS search space, the search space may be the MBS search space, and be used as a search space for monitoring a G-RNTI for MBS reception.

When the information included in the RRC reconfiguration message of operation 270 is applied by the terminal, in operation 275, the terminal 220 may transmit an RRC reconfiguration complete message to the base station 210 to signal that the information of the RRC reconfiguration message is applied. As such, in operation 280, the terminal 220 may perform MBS communication to receive broadcast or multicast packets. That is, the terminal 220 may receive the MBS services from the base station 210.

Figure 3:
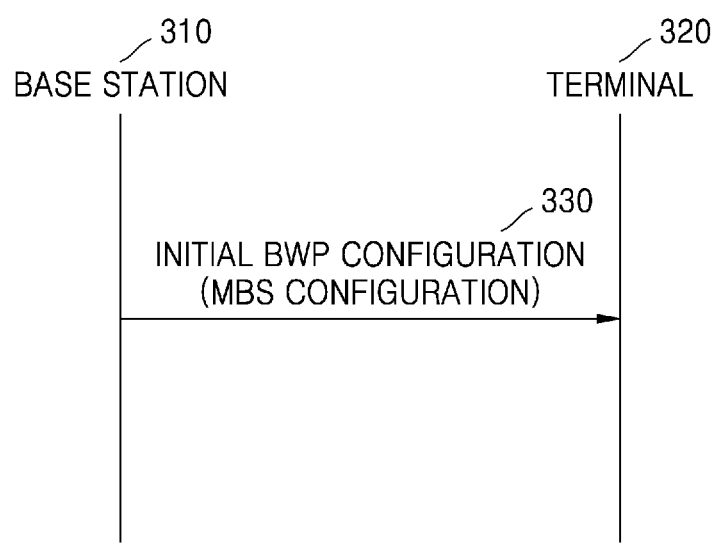
FIG. 3 is a diagram showing a method of configuring an initial bandwidth part (BWP) for MBS reception, according to an embodiment of the disclosure.

FIG. 3 is a diagram showing a method of configuring an initial BWP for MBS reception, according to an embodiment of the disclosure.

In order for a terminal in an RRC idle mode or an RRC inactive mode to receive MBS services, a BWP for MBS reception needs to be configured. Because a plurality of BWPs may be configured for one cell and the terminal may activate only one BWP, the terminal needs to receive the MBS services in the active BWP of the terminal. To this end, a base station may configure a BWP for MBS reception by the terminal in the RRC idle mode or the RRC inactive mode of the terminal. Referring to FIG. 3, a terminal 320 in an RRC idle mode or an RRC inactive mode may receive MBS services in an initial BWP configured by a base station 310. Although the initial BWP indicates a BWP to be used for initial access by the terminal, the initial BWP may be used for MBS reception in the embodiment of FIG. 3. The base station 310 may configure the initial BWP by transmitting an initial BWP configuration message 330 to the terminal 320. The initial BWP configuration message may be periodically transmitted using a SIB, or transmitted when the terminal transitions to the RRC idle mode or the RRC inactive mode based on an RRC release message or the like. In another embodiment, the initial BWP may be configured by transmitting initial BWP information by using an RRC reconfiguration message. The initial BWP configuration message may include at least one of a BWP ID of the initial BWP, TMGIs of MBS services servable in the BWP, or a G-RNTI value used to receive MBS data. The terminal may receive the MBS services in the RRC idle mode or the RRC inactive mode by applying the information included in the initial BWP configuration message. According to an embodiment, the terminal may detect whether data for MBS reception exists, by using the G-RNTI in the initial BWP configured in the RRC idle mode or the RRC inactive mode, and receive the MBS services in a DL radio resource using the G-RNTI, when the DL radio resource using the G-RNTI is detected.

A search space and a control resource set (CORESET) for a physical downlink control channel (PDCCH) to be monitored by the terminal to receive the MBS services in the initial BWP may be included and configured in the initial BWP configuration message 330. Although the embodiment of FIG. 3 is focused on the terminal in the RRC idle mode or the RRC inactive mode, without being limited thereto, the terminal may also receive the MBS services in the initial BWP in an RRC connected mode.

Figure 4:
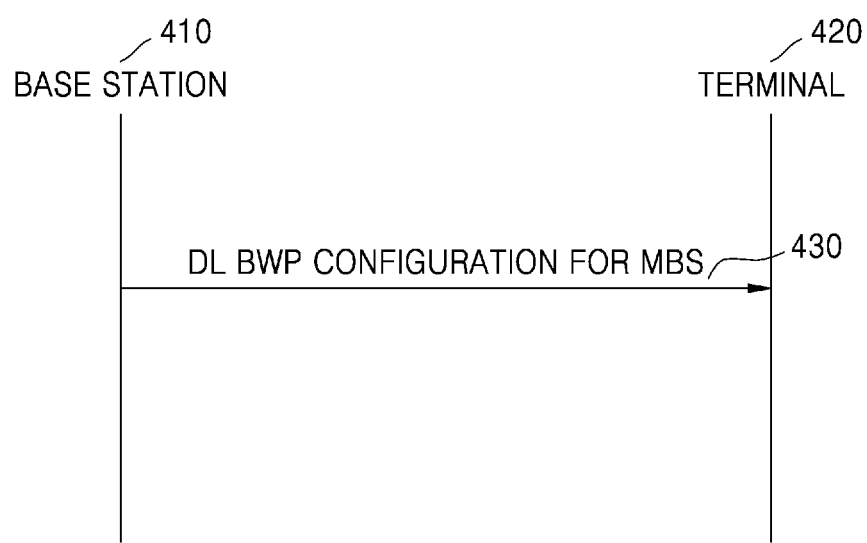
FIG. 4 is a diagram showing a method of configuring a downlink (DL) BWP for MBS reception, according to an embodiment of the disclosure.

FIG. 4 is a diagram showing a method of configuring a DL BWP for MBS reception, according to an embodiment of the disclosure.

In order for a terminal in an RRC idle mode or an RRC inactive mode to receive MBS services, a BWP for MBS reception needs to be configured. Because a plurality of BWPs may be configured for one cell and the terminal may activate only one BWP, the terminal needs to receive the MBS services in the active BWP of the terminal. To this end, a base station may configure a DL BWP for MBS reception by the terminal in the RRC idle mode or the RRC inactive mode. Referring to FIG. 4, a terminal 420 in an RRC idle mode or an RRC inactive mode may receive MBS services in a DL BWP configured by a base station 410. The DL BWP configured by the base station 410 is a BWP configured by the base station 410 for MBS reception by the terminal 420, and may be configured for the terminal of the RRC idle mode or the RRC inactive mode to receive specific MBS services. The DL BWP for MBS may be configured using a DL BWP configuration message 430 for MBS, which is transmitted from the base station 410 to the terminal 420. The DL BWP configuration message for MBS may be periodically transmitted using a SIB, or transmitted when the terminal transitions to the RRC idle mode or the RRC inactive mode based on an RRC release message or the like. In another embodiment, the DL BWP may be configured by transmitting DL BWP information for MBS by using an RRC reconfiguration message. The DL BWP configuration message for MBS may include at least one of a BWP ID of the BWP, TMGIs of MBS services servable in the BWP, or a G-RNTI value used to receive MBS data. The terminal may receive the MBS services in the RRC idle mode or the RRC inactive mode by applying the above-described information. The DL BWP for MBS, which is configured in the embodiment of FIG. 4, may be different from an initial BWP. According to an embodiment, the terminal may detect whether data for MBS reception exists, by using the G-RNTI in the DL BWP for MBS configured in the RRC idle mode or the RRC inactive mode, and receive the MBS services in a DL radio resource using the G-RNTI, when the DL radio resource is detected. However, in another embodiment, the terminal may detect a DL radio resource by using a G-RNTI in the initial BWP, and receive the DL radio resource in the configured DL BWP for MBS. A search space and a CORESET for a PDCCH to be monitored by the terminal to receive the MBS services in the active BWP may be included and configured in the DL BWP configuration message 430 for MBS.

Figure 5:
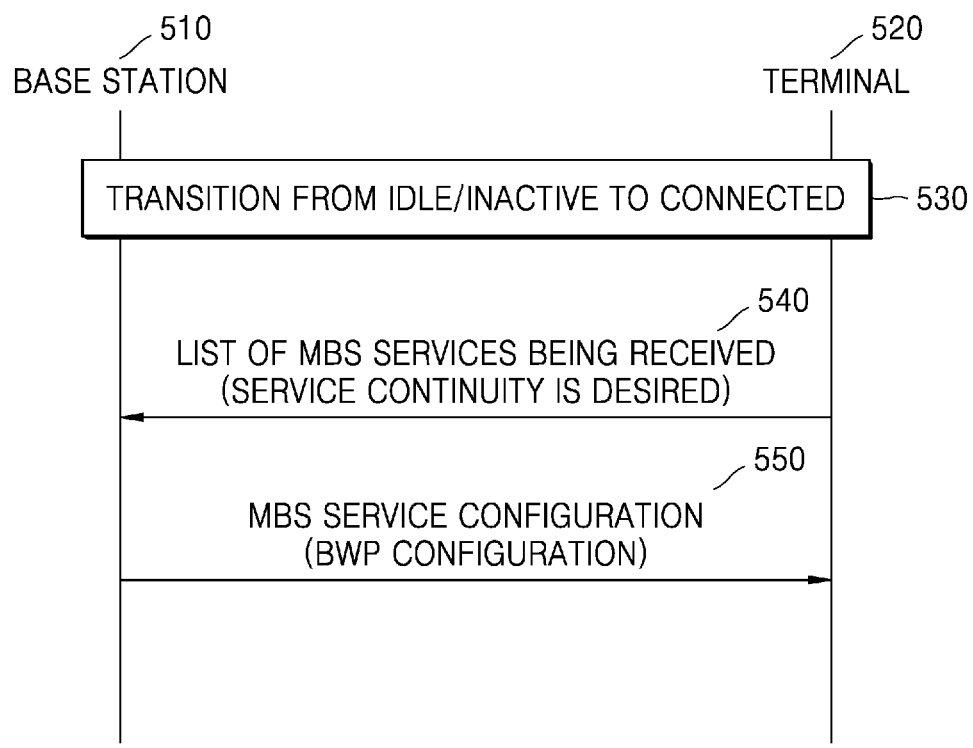
FIG. 5 is a diagram showing an operation for MBS reception when transitioning to a radio resource control (RRC) connected mode, according to an embodiment of the disclosure.

FIG. 5 is a diagram showing an operation for MBS reception when transitioning to an RRC connected mode, according to an embodiment of the disclosure.

A terminal may receive MBS services in an RRC idle mode or an RRC inactive mode according to the method described above in relation to FIG. 3 or 4. A transition to an RRC connected mode may be required according to a preset condition while the terminal is receiving the MBS services. Referring to FIG. 5, in operation 530, a terminal 520 in an RRC idle mode or an RRC inactive mode may perform a procedure for transitioning to an RRC connected mode. To transition to the RRC connected mode, the terminal 520 may transmit an RRC connection request message or an RRC resume request message to the base station 510. As such, the terminal 520 may request to transition to the RRC connected mode by transmitting the RRC connection request message or the RRC resume request message to the base station 510. When the terminal is receiving the MBS services in the RRC idle mode or the RRC inactive mode and desires to continuously receive the MBS services in the RRC connected mode, in operation 540, the terminal 520 may transmit, to the base station 510, a list of MBS services being received by the terminal 520 in the RRC idle mode or the RRC inactive mode. The list of MBS services being received by the terminal 520 may include TMGIs of the MBS services being received by the terminal 520. In addition, the terminal 520 may include an indicator indicating that the MBS services are desired to be continuously received in the RRC connected mode, in the list of MBS services being received, and transmit the list of MBS services to the base station 510. In another embodiment, the terminal 520 may separately transmit, to the base station 510, a list of MBS services desired to be continuously received in the RRC connected mode and a list of MBS services no longer desired to be received in the list of MBS services being received. In another embodiment, the terminal 520 may transmit, to the base station 510 when transitioning to the RRC connected mode, only a list of MBS services desired to be continuously received in the RRC connected mode in the list of MBS services being received. In operation 550, the base station 510 may transmit configuration information of MBS services receivable in the RRC connected mode to the terminal 520 based on the information received from the terminal 520. The configuration information of the MBS services receivable in the RRC connected mode may include a list of TMGIs receivable by the terminal, configuration information of a radio bearer for MBS, G-RNTI information, etc. The base station 510 may configure an active BWP for MBS reception by the terminal. The terminal may continuously receive the MBS services in the RRC connected mode, based on the above-described configuration information.

Figure 6:
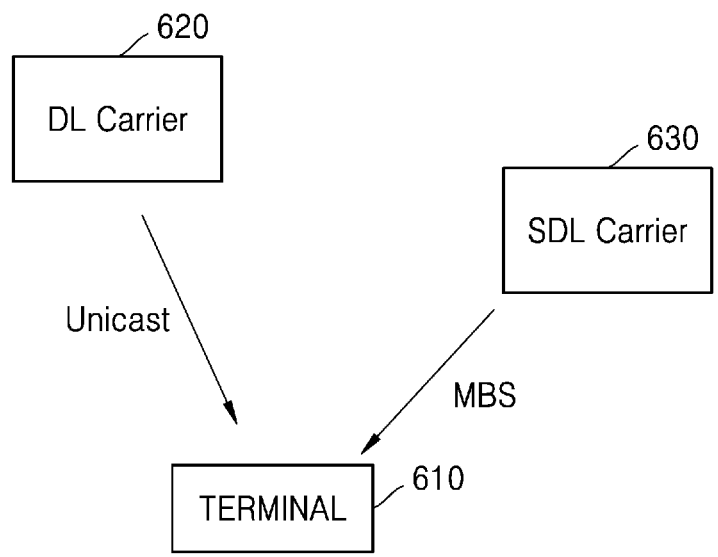
FIG. 6 is a diagram showing a method of configuring a dedicated carrier for MBS, according to an embodiment of the disclosure.

FIG. 6 is a diagram showing a method of configuring a dedicated carrier for MBS, according to an embodiment of the disclosure.

A base station for providing MBS services may provide the MBS services in a specific carrier or a specific cell. In a mobile communication network, terminals for receiving MBS services and terminals for receiving unicast communication services other than MBS services may coexist. In addition, any terminal 610 may receive both unicast communication services and MBS services. A mobile communication service provider or a base station for mobile communication may provide unicast data and MBS data in different carriers or cells. Referring to FIG. 6, normal unicast data may be transmitted in a DL carrier 620, and MBS data may be transmitted in a dedicated carrier such as a supplementary downlink (SDL) carrier. However, the above example is merely an embodiment and, without being limited thereto, the unicast data may be transmitted in any cell whereas the MBS data may be transmitted in another cell. To divide traffic, the base station may configure, for the terminal, an SDL carrier or a dedicated cell for MBS. Configuration information for dividing traffic may be transmitted using a SIB as described above in relation to FIG. 3 or 4, or using at least one of an RRC release message or an RRC reconfiguration message. The configuration information may include a physical-layer cell ID (PCI) or SDL configuration indicator of a SDL carrier or cell for MBS. In addition, the configuration information may include a list of MBS services being provided in the SDL carrier or cell for MBS. The list of MBS services may include TMGIs.

Figure 7:
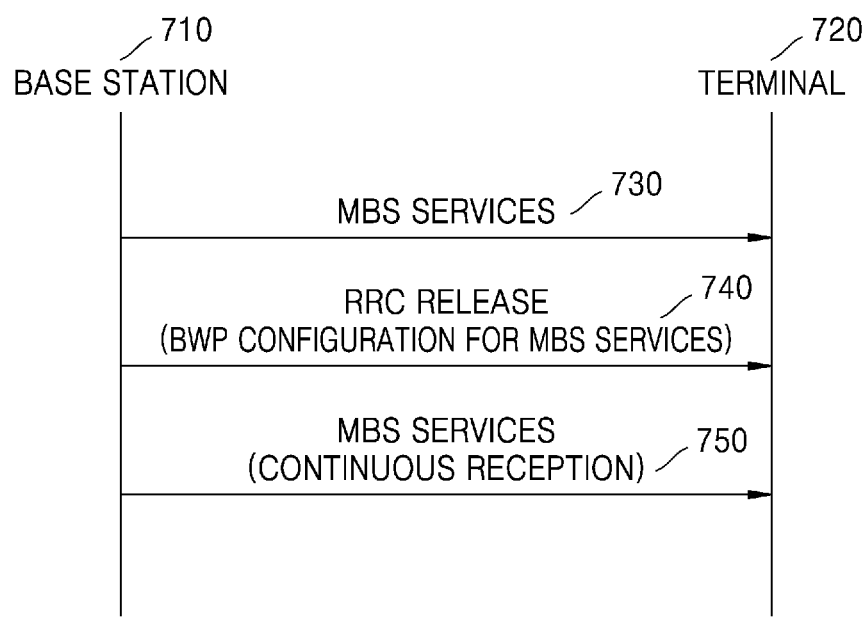
FIG. 7 is a diagram showing an operation for MBS reception when transitioning to an RRC idle mode or an RRC inactive mode, according to an embodiment of the disclosure.

FIG. 7 is a diagram showing an operation for MBS reception when transitioning to an RRC idle mode or an RRC inactive mode, according to an embodiment of the disclosure.

Referring to FIG. 7, in operation 730, a terminal 720 may receive MBS configuration from a base station 710 to receive MBS services in an RRC connected mode. At this time, when the base station 710 determines that RRC connected mode communication with the terminal 720 is no longer necessary, in operation 740, the base station 710 may transmit an RRC release message to the terminal 720 to instruct the terminal 720 to transition to an RRC idle mode or an RRC inactive mode. However, when the terminal 720 is already receiving the MBS services in the RRC connected mode and required to continuously receive the MBS services, MBS configuration for continuously receiving the MBS services in the RRC idle mode or the RRC inactive mode is required for the terminal 720. The MBS configuration for continuously receiving the MBS services may include configuration of a BWP for MBS reception by the terminal 720 in the RRC idle mode or the RRC inactive mode. To configure the BWP for MBS reception by the terminal 720, the base station 710 may include a BWP ID of a BWP for MBS reception by the terminal 720 in the RRC idle mode or the RRC inactive mode, in an RRC release message to be transmitted to the terminal. However, without being limited thereto, in an embodiment, the BWP ID may not be included in the RRC release message and the base station 710 may instruct the terminal 720 to continuously use a current active BWP. In another embodiment, the BWP ID may not be included in the RRC release message and the base station 710 may instruct the terminal 720 to switch to an initial BWP to receive the MBS services. In another embodiment, the BWP ID may not be included in the RRC release message and the base station 710 may instruct the terminal 720 to switch to an initial BWP to receive the MBS services. In another embodiment, although the terminal may receive the MBS services by using the BWP in the RRC idle mode or the RRC inactive mode when the BWP ID indicating the BWP for MBS reception is included in the RRC release message, when the BWP ID is not included in the RRC release message, the terminal may receive the MBS services in the initial BWP. In another embodiment, although the terminal may receive the MBS services by using the BWP in the RRC idle mode or the RRC inactive mode when the BWP ID indicating the BWP for MBS reception is included in the RRC release message, when the BWP ID is not included in the RRC release message, the terminal may receive the MBS services in the last active BWP used in the RRC connected mode. In another embodiment, although the terminal may receive the MBS services by using the BWP in the RRC idle mode or the RRC inactive mode when the BWP ID indicating the BWP for MBS reception is included in the RRC release message, when the BWP ID is not included in the RRC release message, the terminal may receive the MBS services in a default BWP. The MBS configuration information included and transmitted in the RRC release message may include a list of MBS services usable by the terminal in the BWP. The list of MBS services may include a list of TMGIs. In operation 750, the terminal 720 may continuously receive the MBS services in the RRC idle mode or the RRC inactive mode. When MBS services that the terminal is currently receiving and desires to continuously receive are not included in the list of MBS services included in the RRC release message, after RRC release, the terminal 720 may transmit an RRC setup request message or an RRC resume request message to the base station 710 to transition back to the RRC connected mode.

In an embodiment, when an indicator indicating that the MBS services being received by the terminal are not discontinued is included (or an indicator indicating that the MBS services are discontinued is not included) in the RRC release message in the RRC release operation of the base station, and when MBS services that the terminal is currently receiving and desires to continuously receive are not included in the RRC release message, after RRC release, the terminal may transmit an RRC setup request message or an RRC resume request message to the base station to transition back to the RRC connected mode. Unlike this, when an indicator indicating that the MBS services being received by the terminal are not discontinued is not included (or an indicator indicating that the MBS services are discontinued is included) in the RRC release message in the RRC release operation of the base station, and when MBS services that the terminal is currently receiving and desires to continuously receive are not included in the RRC release message, the terminal may transition to the RRC idle mode or the RRC inactive mode and no longer receive the MBS services.

Figure 8:
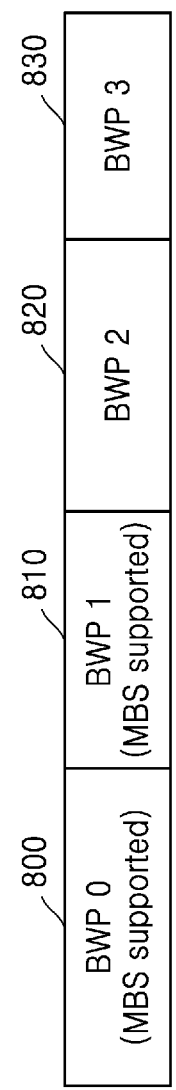
FIG. 8 is a diagram showing a BWP configuration method for MBS, according to an embodiment of the disclosure.

FIG. 8 is a diagram showing a BWP configuration method for MBS, according to an embodiment of the disclosure. A base station may operate a plurality of BWPs in one cell, and configure one active BWP for one terminal at a single timing. MBS services may be provided in all or some of the plurality of BWPs.

Referring to FIG. 8, it is assumed that a total of four BWPs 800, 810, 820, and 830 are configured for one cell. MBS data may be transmitted only in the BWP0 800 and the BWP1 810 among the four BWPs 800, 810, 820, and 830, and no MBS data may be transmitted in the other BWPs, i.e., the BWP2 820 and the BWP3 830.

The embodiment of FIG. 8 assumes that the same MBS services are provided in the two BWPs 800 and 810 for transmitting MBS data. Therefore, when a terminal may receive data in at least one of the BWP0 800 or the BWP1 810, the terminal may receive the same MBS services. In this case, the terminal needs to know which BWPs are used to transmit MBS data. To this end, a base station may signal BWPs for transmitting MBS data, to the terminal by using at least one of an RRC reconfiguration message, an RRC setup message, an RRC reestablishment message, an RRC release message, or an SIB message. In an embodiment, the base station may signal, to the terminal, a list of BWPs for transmitting MBS data in each cell. In another embodiment, the base station may transmit, to the terminal, BWP configuration information including an indicator indicating whether each BWP is a BWP for transmitting MBS data.

Figure 9:
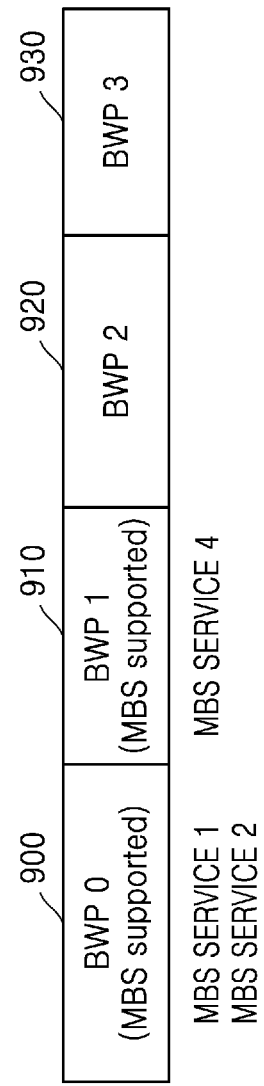
FIG. 9 is a diagram showing a BWP configuration method for MBS, according to an embodiment of the disclosure.

FIG. 9 is a diagram showing a BWP configuration method for MBS, according to an embodiment of the disclosure. A base station may operate a plurality of BWPs in one cell, and configure one active BWP for one terminal at a single timing. MBS services may be provided in all or some of the plurality of BWPs.

Referring to FIG. 9, it is assumed that a total of four BWPs 900, 910, 920, and 930 are configured for one cell. MBS data may be transmitted only in the BWP0 900 and the BWP1 910 among the four BWPs 900, 910, 920, and 930, and no MBS data may be transmitted in the other BWPs, i.e., the BWP2 920 and the BWP3 930.

The embodiment of FIG. 9 assumes that different MBS services are provided in two BWPs for transmitting MBS data. Therefore, to receive any MBS service, a terminal has to receive data in a BWP for providing the MBS service. In this case, the terminal needs to know which BWPs are used to transmit data for which MBS services. As such, a base station may signal a list of MBS services provided in each BWP, to the terminal by using at least one of an RRC reconfiguration message, an RRC setup message, an RRC reestablishment message, an RRC release message, or an SIB message. In an embodiment, the list of MBS services provided in the BWP may include a list of TMGIs.

Figure 10:
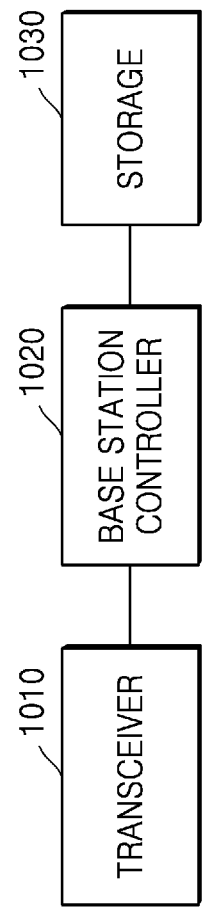
FIG. 10 is a diagram showing a structure of a base station according to an embodiment of the disclosure.

FIG. 10 is a diagram showing a structure of a base station according to an embodiment of the disclosure.

Referring to FIG. 10, the base station may include a transceiver 1010, a controller 1020, and a storage 1030. In the disclosure, the controller 1020 may be defined as a circuit, an application-specific integrated circuit, or at least one processor. According to the above-described communication method of the base station, the transceiver 1010, the controller 1020, and the storage 1030 of the base station may operate. However, the elements of the base station are not limited to the above-mentioned examples. For example, the base station may include more or less elements than the above-mentioned elements. In addition, the transceiver 1010, the controller 1020, and the storage 1030 may be implemented in the form of one chip.

The transceiver 1010 may transmit or receive signals to or from another network entity. The transceiver 1010 may transmit, for example, system information or a synchronization or reference signal to a terminal. The transceiver 1010 collectively refers to a receiver of the base station and a transmitter of the base station, and may transmit or receive signals to or from a terminal or a network entity. The signals transmitted to or received from the terminal or the network entity may include control information and data. To this end, the transceiver 1010 may include a radio-frequency (RF) transmitter for up-converting a frequency of and amplifying a signal to be transmitted, and an RF receiver for low-noise-amplifying and down-converting a frequency of a received signal. However, the RF transmitter and the RF receiver are merely examples and the elements of the transceiver 1010 are not limited thereto. The transceiver 1010 may receive signals through wireless channels and output the signals to the controller 1020, and transmit signals output from the controller 1020, through the wireless channels.

The controller 1020 may control overall operations of the base station, according to an embodiment of the disclosure. For example, the controller 1020 may control the flow of signals between blocks to perform the above-described operations based on each flowchart. The controller 1020 may receive control signals and data signals through the transceiver 1010, and process the received control and data signals. The controller 1020 may transmit the processed control and data signals through the transceiver 1010. The controller 1020 may control each element of the base station to configure and transmit DCI including PDSCH allocation information. The controller 1020 may be provided as one or more controllers, and include one or more processors. The controller 1020 may control the elements of the base station by executing a program stored in the storage 1030.

The storage 1030 may store at least one of information transmitted or received through the transceiver 1010, or information generated by the controller 1020. The storage 1030 may be defined as a 'memory'. The storage 1030 may store programs and data required to operate the base station. The storage 1030 may store control information or data included in signals obtained by the base station. The storage 1030 may include a storage medium such as read-only memory (ROM), random access memory (RAM), a hard disk, a compact disc-ROM (CD-ROM), or a digital versatile disc (DVD), or a combination of such storage media. The storage 1030 may be included in the controller 1020 instead of being provided as a separate element.

Figure 11:
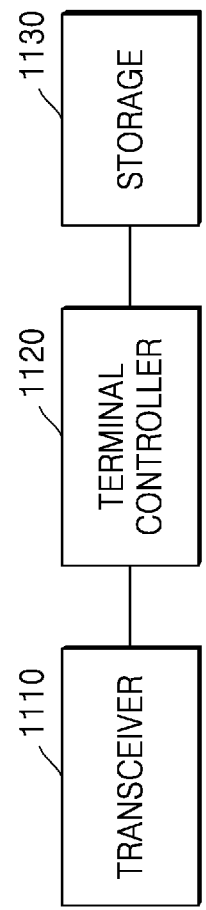
FIG. 11 is a diagram showing a structure of a terminal according to an embodiment of the disclosure.

FIG. 11 is a diagram showing a structure of a terminal according to an embodiment of the disclosure.

Referring to FIG. 11, the terminal may include a transceiver 1110, a controller 1120, and a storage 1130. In the disclosure, the controller may be defined as a circuit, an application-specific integrated circuit, or at least one processor. According to the above-described communication method of the terminal, the transceiver 1110, the controller 1120, and the storage 1130 of the terminal may operate. However, the elements of the terminal are not limited to the above-mentioned examples. For example, the terminal may include more or less elements than the above-mentioned elements. In addition, the transceiver 1110, the controller 1120, and the storage 1130 may be implemented in the form of one chip.

The transceiver 1110 may transmit or receive signals to or from another network entity. The transceiver 1110 may receive, for example, system information or a synchronization or reference signal from a base station. The transceiver 1110 collectively refers to a receiver of the terminal and a transmitter of the terminal, and may transmit or receive signals to or from a network entity, a base station, or another terminal. The signals transmitted to or received from the network entity, the base station, or the other terminal may include control information and data. To this end, the transceiver 1110 may include an RF transmitter for up-converting a frequency of and amplifying a signal to be transmitted, and an RF receiver for low-noise-amplifying and down-converting a frequency of a received signal. However, the RF transmitter and the RF receiver are merely examples and the elements of the transceiver 1110 are not limited thereto. The transceiver 1110 may receive signals through wireless channels and output the signals to the controller 1120, and transmit signals output from the controller 1120, through the wireless channels.

The controller 1120 may control overall operations of the terminal, according to an embodiment of the disclosure. For example, the controller 1120 may control the flow of signals between blocks to perform the above-described operations based on each flowchart. The controller 1120 may receive control signals and data signals through the transceiver 1110, and process the received control and data signals. The controller 1120 may transmit the processed control and data signals through the transceiver 1110. The controller 1120 may receive DCI configured in two layers and control the elements of the terminal to simultaneously receive a plurality of PDSCHs. The controller 1120 may be provided as one or more controllers, and include one or more processors. The controller 1120 may control the elements of the terminal by executing a program stored in the storage 1130.

The storage 1130 may store at least one of information transmitted or received through the transceiver 1110, or information generated by the controller 1120. The storage 1130 may be defined as a 'memory'. The storage 1130 may store programs and data required to operate the terminal The storage 1130 may store control information or data included in signals obtained by the terminal The storage 1130 may include a storage medium such as ROM, RAM, a hard disk, a CD-ROM, or a DVD, or a combination of such storage media. The storage 1130 may be included in the controller 1120 instead of being provided as a separate element.

Figure 12:
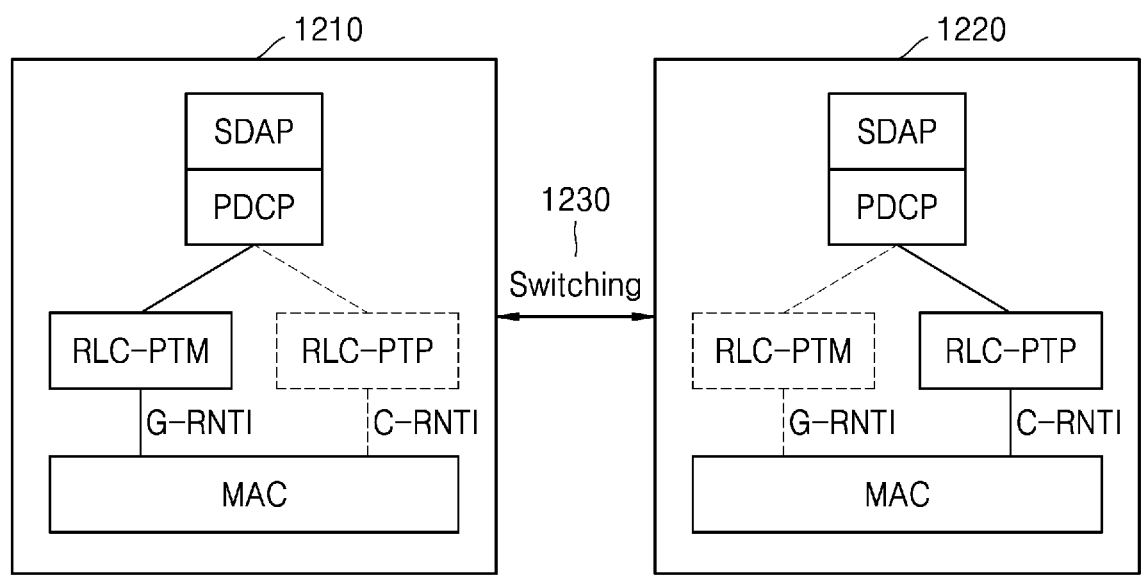
FIG. 12 is a diagram showing an MBS split bearer and path switching, according to an embodiment of the disclosure.

FIG. 12 is a diagram showing an MBS split bearer and path switching, according to an embodiment of the disclosure.

In MBS, because a plurality of terminals receive data, transmission to one specific terminal may not be ensured. When provided MBS services require high stability, broadcast or multicast transmission may not easily satisfy the requirement. For this reason, some packets of MBS data need to be transmitted in a unicast manner. To this end, an MBS radio bearer (MRB) using both point to multipoint (PTM) and point to point (PTP) transmissions instead of using specific PTM or PTP transmission only may be defined. Because this MRB processes the same MBS services, only one service data adaptation protocol (SDAP) layer and only one packet data convergence protocol (PDCP) layer may be connected to a higher layer, and a radio link control (RLC) layer may include two or more RLC entities to use any RLC for PTM transmission (RLC-PTM or PTM RLC) and another RLC for PTP transmission (RLC-PTP or PTP RLC). Each RLC entity may correspond to a logic channel and the PTM RLC may be transmitted using a radio resource allocated with a G-RNTI whereas the PTP RLC may be transmitted using a radio resource allocated with a cell-radio network temporary identity (C-RNTI). Such radio bearer having both the PTP RLC and the PTM RLC may be referred to as an MBS split radio bearer.

The embodiment of FIG. 12 shows an operation of determining whether to transmit MBS data in a PTM or PTP manner, based on selection of a base station. The base station may determine whether to use the PTM RLC or the PTP RLC to transmit data, in consideration of various factors, e.g., a location of a terminal, a signal intensity, and the number of terminals for receiving MBS services. To transmit the data by using the PTM RLC, the base station may activate the PTM RLC and deactivate the PTP RLC (1210). In this case, the terminal may receive the data by using the activated PTM RLC. On the contrary, to transmit the data by using the PTP RLC, the base station may activate the PTP RLC and deactivate the PTM RLC (1220). In this case, the terminal may receive the data by using the activated PTP RLC. The PTM RLC may use a unidirectional RLC unacknowledged mode (UM) and the PTP RLC may use a unidirectional or bidirectional RLC UM or an RLC acknowledged mode (AM).

The base station may instruct the terminal to activate and use the PTM RLC or the PTP RLC. The terminal may receive the data by using the RLC instructed by the base station to be activated and used. In another embodiment, the terminal may autonomously determine an activated RLC entity, by detecting the data received from the base station. The operation of determining whether to activate and use the PTM RLC or the PTP RLC will be described in detail below with reference to FIGS. 12 and 13. Based on the above-described method, the base station and the terminal may switch the activated RLC (1230). After the activated RLC is switched, the terminal may transmit a PDCP status report message to the base station to signal successfully received packets and request retransmission.

Figure 13:
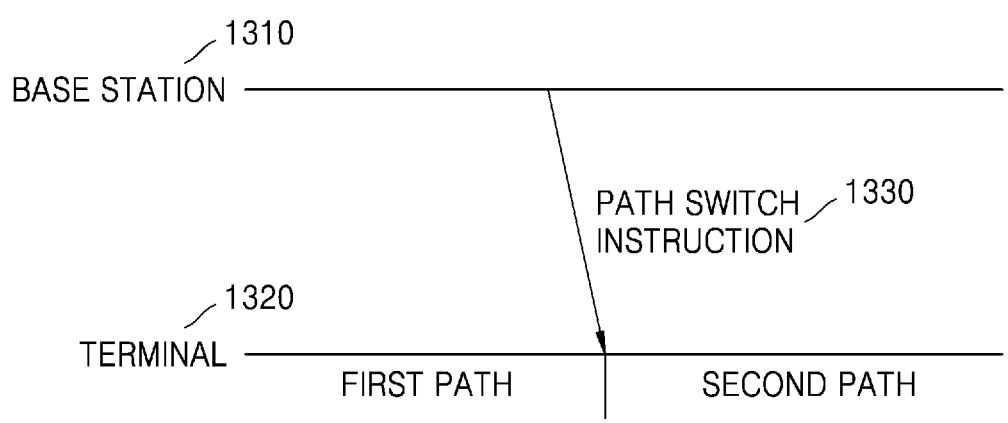
FIG. 13 is a diagram showing an MBS split bearer and a path switch operation, according to an embodiment of the disclosure.

FIG. 13 is a diagram showing an MBS split bearer and a path switch operation, according to an embodiment of the disclosure.

A base station 1310 may provide MBS services to a plurality of terminals through an MRB. In this case, the base station may transmit data to each terminal 1320 by selecting a PTM RLC or a PTP RLC. To this end, the base station may transmit, to the terminal, a message indicating the PTM RLC or the PTP RLC as a data transmission path (also referred to as a path switch instruction message or a path switch instruction message) (1330). The terminal may receive the path switch instruction message, and apply an RLC entity (or a data path) to be activated and used for data transmission, based on the received information. The embodiment of FIG. 13 assumes that the terminal receives data through a first path (e.g., PTM or PTP) and then receives data through a second path (e.g., instructed PTM or PTP) after receiving the path switch instruction message 1330.

The path switch instruction message may be transmitted using a medium access control-control element (MAC CE) or in DCI transmitted on a PDCCH. In this case, the path switch instruction message may include information indicating for which MRB the path is switched, and to which RLC entity the path is switched. As an identity of the RLC entity, at least one of a PTM RLC/PTP RLC indicator or a logic channel ID may be used. In another embodiment, the path switch instruction message may be transmitted using a PDCP control protocol data unit (PDU) to instruct to switch a path of an MRB for transmitting the PDCP control PDU. In this case, the path switch instruction message may include information indicating to which RLC entity the path is switched. As an identity of the RLC entity, at least one of a PTM RLC/PTP RLC indicator or a logic channel ID may be used.

Figure 14:
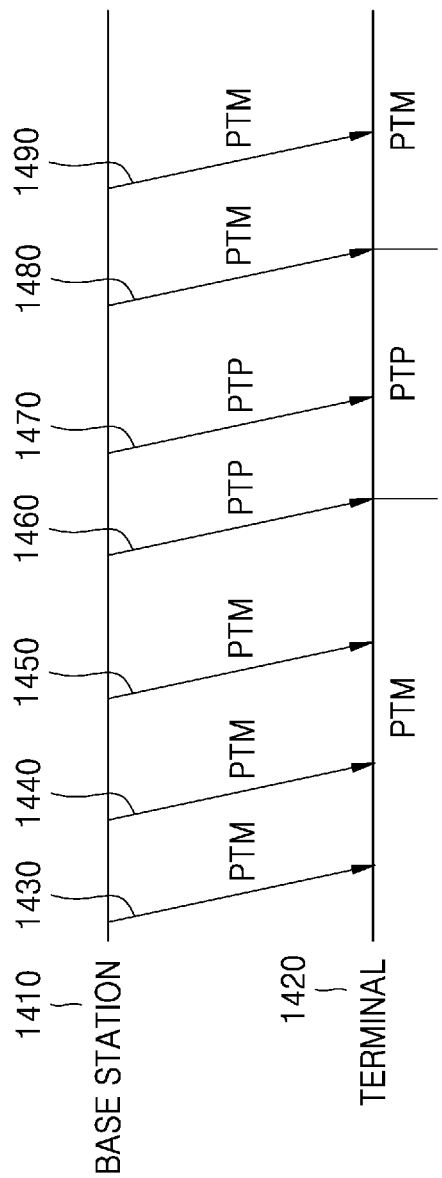
FIG. 14 is a diagram showing an MBS split bearer and a path switch operation, according to an embodiment of the disclosure.

FIG. 14 is a diagram showing an MBS split bearer and a path switch operation, according to an embodiment of the disclosure.

The embodiment of FIG. 14 assumes that a terminal monitors both a PTM RLC and a PTP RLC configured for an MRB but activates only one RLC. To this end, the current embodiment shows a method of switching and applying an activated RLC entity (or an activated data path) when reception of a packet by the PTP RLC entity or the PTM RLC entity is detected. The embodiment of FIG. 14 assumes that a base station 1410 is transmitting data to a terminal 1420 by using the PTM RLC (1430, 1440, and 1450). In this case, the PTM RLC serves as an activated path of the terminal in the MRB. Then, when data to the PTP RLC is detected (1460), the terminal switches the activated RLC entity to the PTP RLC. Thereafter, when the data transmission to the PTP RLC is continued (1470) and then data to the PTM RLC is arrived (1480), the activated RLC entity is switched to the PTM RLC. Then, when data to the PTM RLC is additionally arrived (1490), data reception may be continued using the activated PTM RLC entity.

In an embodiment, once the RLC entity is deactivated or newly activated, the RLC entity may be initialized. That is, state variables of the RLC may be initialized and an RLC reception buffer may be emptied. In another embodiment, the RLC entity may be reestablished. In addition, the activated path may be signaled to a PDCP entity in a higher layer.

Figure 15:
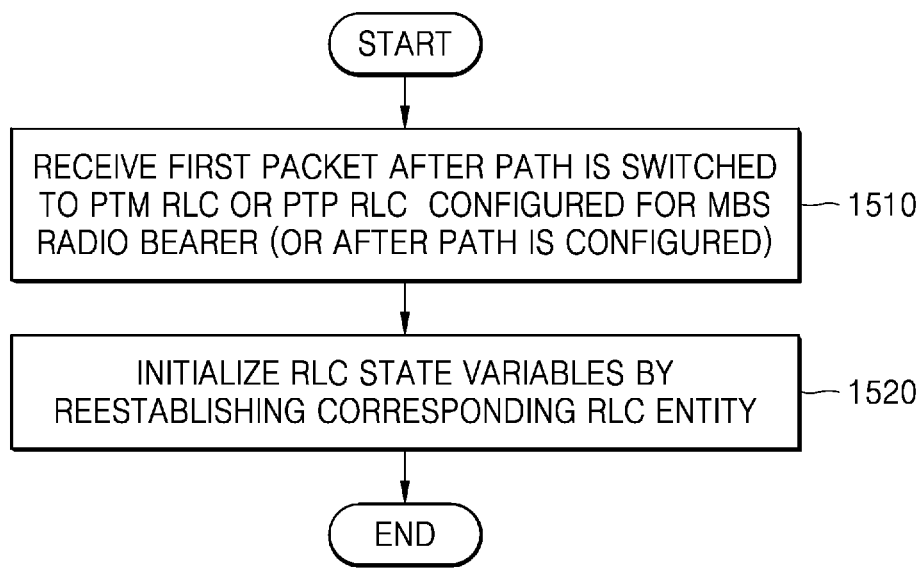
FIG. 15 is a diagram showing an operation of receiving the first packet after a path of an MBS split bearer is switched, according to an embodiment of the disclosure.

FIG. 15 is a diagram showing an operation of receiving the first packet after a path of an MBS split bearer is switched, according to an embodiment of the disclosure.

A terminal may receive the first packet after a path of an MBS split bearer is switched from a PTM RLC to a PTP RLC or vice versa as instructed according to the method of FIG. 13 or 14 or another method (or after an RLC entity is initially configured) (1510). In order for the terminal to receive data of the MRB including the first received packet, the RLC entity may be reestablished (1520). The operation of reestablishing the RLC entity may include an operation of initializing state variables of the RLC and emptying an RLC reception buffer.

Figure 16:
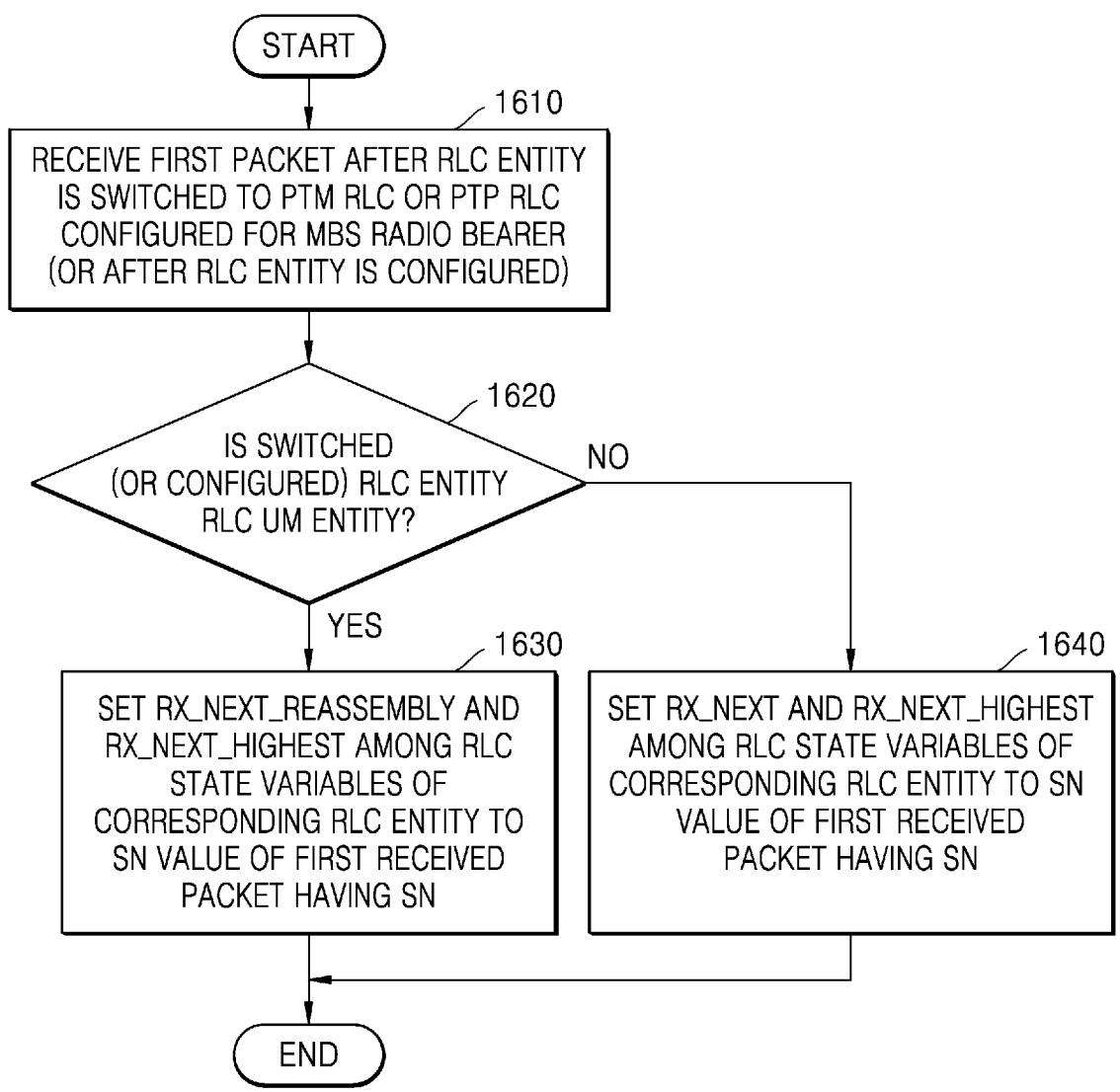
FIG. 16 is a diagram showing an operation of receiving the first packet after a path of an MBS split bearer is switched, according to an embodiment of the disclosure.

FIG. 16 is a diagram showing an operation of receiving the first packet after a path of an MBS split bearer is switched, according to an embodiment of the disclosure.

A terminal may receive the first packet after a path of an MBS split bearer is switched from a PTM RLC to a PTP RLC or vice versa as instructed according to the method of FIG. 13 or 14 or another method (or after an RLC entity is initially configured) (1610). In order for the terminal to receive data of the MRB including the first received packet, state variables of the RLC entity may be initialized and an RLC reception buffer may be emptied. The terminal may determine whether the switched RLC entity (or the initially configured RLC entity) is an RLC UM entity or an RLC AM entity (1620). When the RLC entity is an RLC UM entity, the terminal may set RX_Next_Reassembly and RX_Next_Highest among state variables of the RLC entity to a sequence number (SN) value of the first received packet having a SN (1630). Otherwise, when the RLC entity is an RLC AM entity, the terminal may set RX_Next and RX_Next_Highest among state variables of the RLC entity to a SN value of the first received packet having a SN (1640). Subsequent operations may follow pre-defined RLC reception operations.

Figure 17:
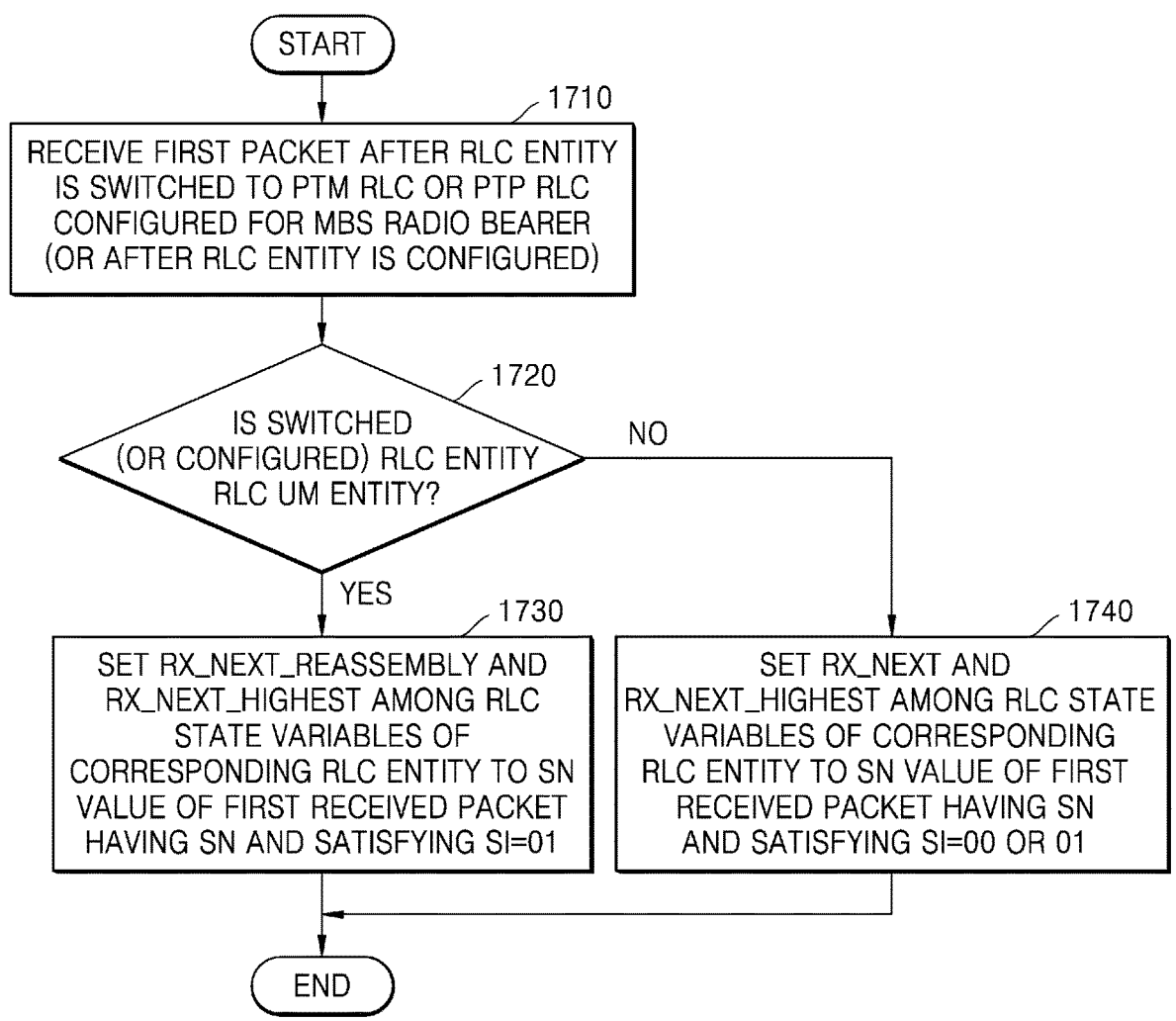
FIG. 17 is a diagram showing an operation of receiving the first packet after a path of an MBS split bearer is switched, according to an embodiment of the disclosure.

FIG. 17 is a diagram showing an operation of receiving the first packet after a path of an MBS split bearer is switched, according to an embodiment of the disclosure.

A terminal may receive the first packet after a path of an MBS split bearer is switched from a PTM RLC to a PTP RLC or vice versa as instructed according to the method of FIG. 13 or 14 or another method (or after an RLC entity is initially configured) (1710). In order for the terminal to receive data of the MRB including the first received packet, state variables of the RLC entity may be initialized and an RLC reception buffer may be emptied. The terminal may determine whether the switched RLC entity (or the initially configured RLC entity) is an RLC UM entity or an RLC AM entity (1720). When the RLC entity is an RLC UM entity, the terminal may set RX_Next_Reassembly and RX_Next_Highest among state variables of the RLC entity to a SN value of the first received packet having a SN and satisfying segment information (SI)=01 (1730). The SI field indicates segmentation of the packet, and the first bit of the SI field indicates whether a front part of the received service data unit (SDU) is segmented, and has a value of 1 when segmented. The second bit of the SI field indicates whether a rear part of the received SDU is segmented, and has a value of 1 when segmented. When the SI field has a value of 01, it indicates that the RLC SDU is first segmented and, when the first segmented packet is received, it may mean that there is a high probability of receiving the entirety of the packet. When it is determined in operation 1720 that the RLC entity is an RLC AM entity, the terminal may set RX_Next and RX_Next_Highest among state variables of the RLC entity to a SN value of the first received packet having a SN and satisfying SI=00 or 01 (1740). When the SI field has a value of 00, it indicates that the RLC SDU is a complete unsegmented RLC SDU. Subsequent operations may follow pre-defined RLC reception operations.

Figure 18:
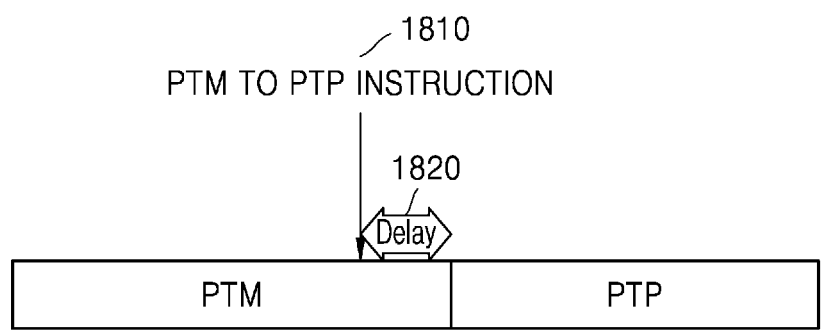
FIG. 18 is a diagram showing an operation of switching a path of an MBS split bearer, according to an embodiment of the disclosure.

FIG. 18 is a diagram showing an operation of switching a path of an MBS split bearer, according to an embodiment of the disclosure.

When instructed to switch a path of an MBS split bearer from a PTM RLC to a PTP RLC or vice versa according to the method of FIG. 13 or 14 or another method (1810), an existing RLC bearer may have data receivable using an existing RLC based on hybrid automatic repeat request (HARQ) retransmission or the like. To complete the reception of the remaining data before switching to the instructed RLC, the switching of the RLC path may be delayed by a preset certain time (1820). A length of the delay time may be set using an RRC reconfiguration message transmitted from a base station. In addition, additional path switching may not be performed during the certain time to prevent unnecessary path switching by retransmitted packets. The embodiment of FIG. 18 shows that the PTM RLC is activated and used and then is switched to the PTP RLC, but is also applicable to a reverse case. Then, the path may be switched to the PTP RLC after the certain delay time and the PTP RLC may be activated and used. The current embodiment shows a method of switching to the PTP RLC after the delay time without switching to the PTM RLC even when data is received by the PTM RLC during the delay time.

Figure 19:
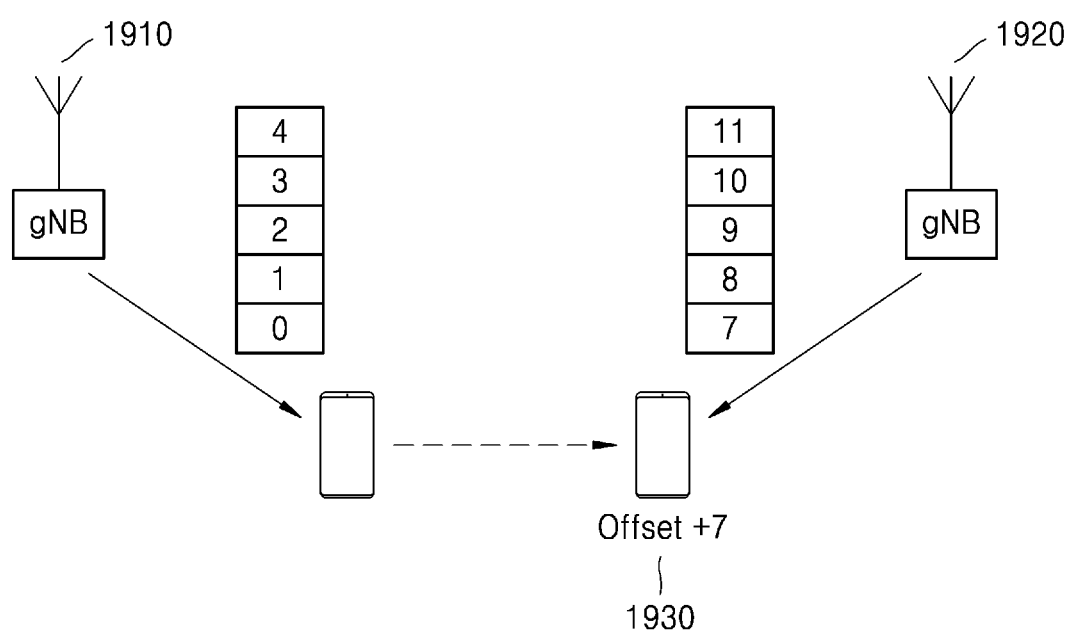
FIG. 19 is a diagram showing operation of an MBS radio bearer (MRB) for handover, according to an embodiment of the disclosure.

FIG. 19 is a diagram showing operation of an MRB for handover, according to an embodiment of the disclosure.

When a terminal receiving MBS services from a serving base station 1910 moves into coverage of a target base station 1920, the terminal may perform a handover procedure with respect to the target base station so as to receive data from the target base station. However, because the base stations operate independently, the same packets (e.g., PDCP PDUs or PDCP SDUs) may not have the same PDCP SNs. In the embodiment of FIG. 19, packets allocated with SNs of 0, 1, 2, 3, and 4 may be allocated and used with SNs of 7, 8, 9, 10, and 11 in the target base station. In this case, the terminal needs to change the used SNs for handover. In the embodiment of FIG. 19, the serving base station and the target base station have a SN difference of 7 for PDCP packets of a specific MRB. Therefore, the serving base station may transmit an RRC reconfiguration message for handover to signal a difference of 7 in PDCP SNs from the target base station, and the terminal may change the PDCP SNs by using the difference after handover and continuously use the MRB for the same services in the target base station. The terminal may also compensate PDCP state variables by the PDCP SN difference to perform PDCP reception operation. When a PDCP status report message is transmitted to the target base station after handover, COUNT values used in the PDCP status report message may be COUNT values to be converted and derived to SNs used in the target base station.

Figure 20:
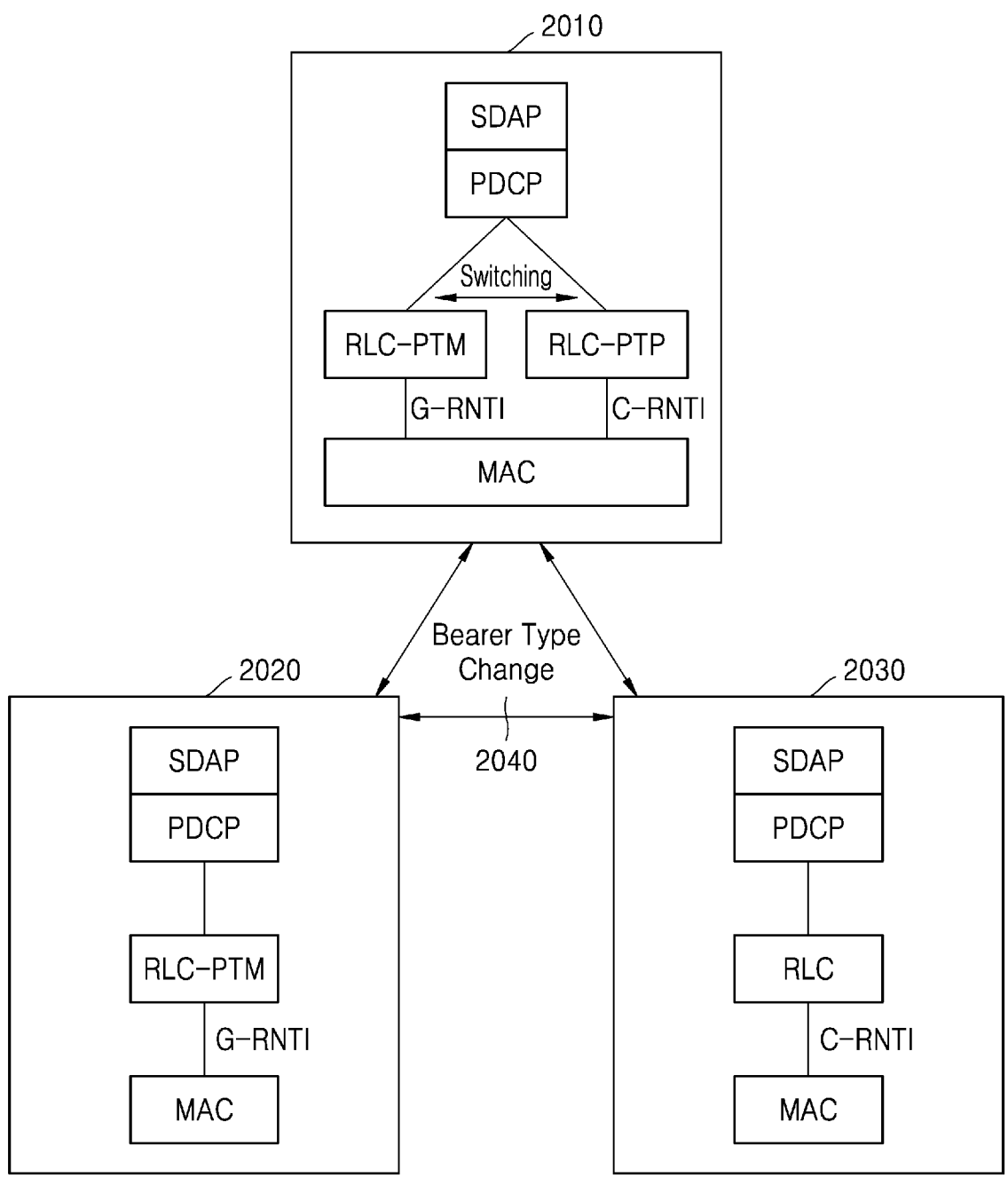
FIG. 20 is a diagram showing changing of a bearer type including an MBS split bearer, according to an embodiment of the disclosure.

FIG. 20 is a diagram showing changing of a bearer type including an MBS split bearer, according to an embodiment of the disclosure.

In MBS, because a plurality of terminals receive data, transmission to one specific terminal may not be ensured. When provided MBS services require high stability, broadcast or multicast transmission may not easily satisfy the requirement. For this reason, some packets of MBS data need to be transmitted in a unicast manner. To this end, an MRB using both PTM and PTP transmissions instead of using specific PTM or PTP transmission only may be defined. Because this MRB processes the same MBS services, only one SDAP layer and only one PDCP layer may be connected to a higher layer, and an RLC layer may include two or more RLC entities to use any RLC for PTM transmission (RLC-PTM or PTM RLC) and another RLC for PTP transmission (RLC-PTP or PTP RLC). Each RLC entity may correspond to a logic channel and the PTM RLC may be transmitted using a radio resource allocated with a G-RNTI whereas the PTP RLC may be transmitted using a radio resource allocated with a C-RNTI. Such radio bearer having both the PTP RLC and the PTM RLC may be referred to as an MBS split radio bearer (2010). A base station may arbitrarily determine an RLC entity of the MBS split radio bearer to be used for data transmission. In addition, the base station may switch a data transmission path. A PDCP entity of a terminal may receive packets in order without duplicates by using reordering and duplicate detection technologies. The MBS split radio bearer shown in operation 2010 assumes that data is always received by a PTM RLC and a PTP RLC of the terminal.

However, the MRB does not necessarily have the PTP RLC. That is, when the base station has no problem with multicast or broadcast transmission using the PTM RLC, the PTP RLC is not additionally required. Such radio bearer having one PTM RLC may be referred to as a PTM MRB (2020). A radio bearer not having the PTM RLC but having only the PTP RLC to which a resource is allocated with a C-RNTI may also exist. Such radio bearer may be referred to as a DRB due to the same structure as an existing DRB, and also referred to as a PTP MRB with respect to a radio bearer for transmitting MBS data (2030). A bearer type may be changed between the MBS split radio bearer, the PTM MRB, and the PTP MRB.

When PDCP SNs are constantly maintained or a SN difference is compensated for as described above in relation to FIG. 19 to change the bearer type, the terminal may transmit a PDCP status report message to the base station to request retransmission. To this end, when the MRB (e.g., the MBS split radio bearer, the PTM MRB, or the PTP MRB) is configured, information indicating whether to maintain the PDCP SNs (or, in some embodiments, whether to reestablish the MRB) may be additionally signaled to the terminal. In another embodiment, when the MRB is configured, the base station may signal a PDCP SN (or COUNT) difference to the terminal The PDCP status report message may be transmitted only when the PTP RLC is an RLC AM and not transmitted when the PTP RLC is an RLC UM. In some embodiments, when at least one of RLC release, MAC reset, or RLC reestablishment is performed to change the bearer type, the PDCP status report message may be transmitted to the base station.

In an embodiment, a machine-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer that stores data temporarily.

According to an embodiment, the method according to various embodiments of the disclosure may be included and provided in a computer program product. The computer program product may be traded as a commercial product between a seller and a buyer. The computer program product may be distributed in the form of a machine-readable storage medium (e.g., a compact disc read only memory (CD-ROM)), or be electronically distributed (e.g., downloaded or uploaded) via an application store (e.g., Play Store™) or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

The embodiments disclosed in this specification and the drawings are merely to easily describe technical content of the disclosure and to promote understanding of the disclosure, and do not limit the scope of the disclosure. That is, it will be understood by one of ordinary skill in the art that the embodiments may be modified without departing from the scope of the disclosure. The embodiments may be combined to be implemented, when required. For example, a base station and a terminal may operate based on a combination of parts of an embodiment and another embodiment of the disclosure. The embodiments of the disclosure are also applicable to other communication systems, and may be modified without departing from the scope of the disclosure.

The invention claimed is:

1. A method, performed by a terminal, for performing multicast and broadcast service (MBS) in a wireless communication system, the method comprising:
   receiving, from a base station, configuration information associated with a first MBS radio bearer (MRB), wherein the first MRB is associated with a first radio link control (RLC) entity for point to point (PTP)

transmission and a second RLC entity for point to multipoint (PTM) transmission; and receiving, from the base station, MBS data based on the first MRB.

2. A method, performed by a base station for performing multicast and broadcast service (MBS) in a wireless communication system, the method comprising:

transmitting, to a terminal configuration information associated with a first MBS radio bearer (MRB), wherein the first MRB is associated with a first radio link control (RLC) entity for point to point (PTP) transmission, and a second RLC entity for point to multipoint (PTM) transmission; and transmitting, to the terminal, MBS data based on the first MRB.

3. A terminal for performing multicast and broadcast service (MBS) in a wireless communication system, the terminal comprising:

a transceiver; and at least one processor coupled to the transceiver and configured to:

receive, from a base station, configuration information associated with a first MBS radio bearer (MRB), wherein the first MRB is associated with a first radio link control (RLC) entity for point to point (PTP) transmission and a second RLC entity for point to multipoint (PTM) transmission, and receive, from the base station, MBS data based on the first MRB.

4. A base station for performing multicast and broadcast service (MBS) in a wireless communication system, the base station comprising:

a transceiver; and at least one processor coupled to the transceiver and configured to:

transmit, to a terminal, configuration information associated with a first MBS radio bearer (MRB), wherein the first MRB is associated with a first radio link control (RLC) entity for point to point (PTP) transmission, and a second RLC entity for point to multipoint (PTM) transmission, and transmit, to the terminal, MBS data based on the first MRB.

5. The method of claim 1, further comprising:

receiving, from the base station, configuration information associated with at least one of a second MRB or a third MRB, wherein the second MRB is associated with the first RLC entity for the PTP transmission, and the third MRB is associated with the second RLC entity for the PTM transmission.

6. The method of claim 5, further comprising:

performing a change of an MRB type among the first MRB, the second MRB, and the third MRB.

7. The method of claim 1, further comprising:

in case that a configured MRB is associated with an acknowledged mode, AM, RLC entity of the first RLC entity for the PTP transmission, transmitting, to the base station, a packet data convergence protocol (PDCP) status report.

8. The method of claim 2, further comprising:

transmitting, to the terminal, configuration information associated with at least one of a second MRB or a third MRB, wherein the second MRB is associated with the first RLC entity for the PTP transmission, and the third MRB is associated with the second RLC entity for the PTM transmission.

9. The method of claim 2, further comprising:

in case that a configured MRB is associated with an acknowledged mode, AM, RLC entity of the first RLC entity for the PTP transmission, receiving, from the terminal, a packet data convergence protocol (PDCP) status report.

10. The terminal of claim 3, wherein the processor is further configured to:

receive, from the base station, configuration information associated with at least one of a second MRB or a third MRB, wherein the second MRB is associated with the first RLC entity for the PTP transmission, and the third MRB is associated with the second RLC entity for the PTM transmission.

11. The terminal of claim 10, wherein the processor is further configured to:

perform a change of an MRB type among the first MRB, the second MRB, and the third MRB.

12. The terminal of claim 3, wherein the processor is further configured to:

in case that a configured MRB is associated with an acknowledged mode, AM, RLC entity of the first RLC entity for the PTP transmission, transmit, to the base station, a packet data convergence protocol (PDCP) status report.

13. The base station of claim 4, wherein the processor is further configured to:

transmit, to the terminal, configuration information associated with at least one of a second MRB or a third MRB, wherein the second MRB is associated with the first RLC entity for the PTP transmission, and the third MRB is associated with the second RLC entity for the PTM transmission.

14. The base station of claim 4, wherein the processor is further configured to:

in case that a configured MRB is associated with an acknowledged mode, AM, RLC entity of the first RLC entity for the PTP transmission, receive, from the terminal, a packet data convergence protocol (PDCP) status report.

* * * * *